United States Patent
Hyun et al.

(10) Patent No.: US 10,013,227 B2
(45) Date of Patent: Jul. 3, 2018

(54) MOBILE DEVICE AND METHOD OF CONTROLLING THEREFOR

(71) Applicant: LG ELECTRONICS INC., Seoul (KR)

(72) Inventors: Juha Hyun, Seoul (KR); Yoonseok Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 15/017,265

(22) Filed: Feb. 5, 2016

(65) Prior Publication Data

US 2017/0115943 A1 Apr. 27, 2017

(30) Foreign Application Priority Data

Oct. 22, 2015 (KR) .................. 10-2015-0147255

(51) Int. Cl.
*G06F 3/048* (2013.01)
*G06F 3/14* (2006.01)
(Continued)

(52) U.S. Cl.
CPC .......... *G06F 3/1423* (2013.01); *G06F 3/0484* (2013.01); *G06F 3/0486* (2013.01);
(Continued)

(58) Field of Classification Search
CPC .. G06F 3/1423; G06F 3/04883; G06F 3/0488; G06F 3/04817; G06F 3/0484;
(Continued)

(56) References Cited

U.S. PATENT DOCUMENTS

2007/0064682 A1* 3/2007 Adams .............. H04L 29/06027
                                                    370/352
2007/0150826 A1* 6/2007 Anzures ................. G06F 3/017
                                                    715/772
(Continued)

FOREIGN PATENT DOCUMENTS

CN          101651735 A     2/2010
EP          2 632 134 A1    8/2013
(Continued)

*Primary Examiner* — Linh K Pham
(74) *Attorney, Agent, or Firm* — Birch, Stewart, Kolasch & Birch, LLP

(57) ABSTRACT

A mobile device including a wireless communication processor configured to receive a call signal from an external device; a display; and a controller configured to display a first screen on the display including options for responding to the received call signal, in response to a touch and drag input in a specific direction, display a second screen on the first screen, respond to the received call signal in a hold mode when the second screen is touched and dragged in a first direction to a first distance, respond to the received call signal in a normal mode when the second screen is touched and dragged in the first direction to a second distance greater than the first distance, and respond to the received call signal in a speakerphone mode when the second screen is touched and dragged in the first direction to a maximum extension of the second screen.

18 Claims, 20 Drawing Sheets

(51) Int. Cl.
*G06F 3/0488* (2013.01)
*G06F 3/0484* (2013.01)
*H04M 1/57* (2006.01)
*G06F 3/0481* (2013.01)
*G06F 3/0486* (2013.01)
*H04M 1/725* (2006.01)
*H04W 88/02* (2009.01)

(52) U.S. Cl.
CPC ........ G06F 3/0488 (2013.01); G06F 3/04817 (2013.01); H04M 1/575 (2013.01); H04M 1/72583 (2013.01); H04W 88/02 (2013.01)

(58) Field of Classification Search
CPC ............ G06F 3/0486; H04M 2250/22; H04M 1/72519; H04M 1/72583
See application file for complete search history.

(56) References Cited

U.S. PATENT DOCUMENTS

| | | | | |
|---|---|---|---|---|
| 2008/0168361 | A1* | 7/2008 | Forstall | G06F 3/0488 715/753 |
| 2009/0285383 | A1* | 11/2009 | Tsuei | G06F 3/04883 379/242 |
| 2012/0094718 | A1* | 4/2012 | Kim | H04M 1/72597 455/559 |
| 2013/0222268 | A1* | 8/2013 | Greisson | H04M 1/576 345/173 |
| 2013/0321340 | A1* | 12/2013 | Seo | G06F 1/1641 345/174 |
| 2014/0063175 | A1* | 3/2014 | Jafry | H04M 1/67 348/14.02 |
| 2014/0171154 | A1* | 6/2014 | Chou | H04M 1/72522 455/566 |
| 2014/0187226 | A1* | 7/2014 | Cui | G06F 3/0487 455/418 |
| 2015/0057048 | A1* | 2/2015 | Wang | H04M 1/27455 455/564 |
| 2015/0080058 | A1* | 3/2015 | Rhee | G06F 3/04817 455/566 |
| 2015/0138101 | A1* | 5/2015 | Park | G06F 3/0412 345/173 |
| 2015/0201058 | A1* | 7/2015 | Cho | H04M 1/72522 455/563 |
| 2015/0346939 | A1* | 12/2015 | Kwak | G06F 3/0412 715/771 |
| 2016/0004376 | A1* | 1/2016 | Mitsunaga | G06F 1/1684 345/173 |
| 2016/0021336 | A1* | 1/2016 | Abbott | H04M 1/72572 348/14.02 |
| 2016/0066277 | A1* | 3/2016 | Yang | H04M 1/6066 455/414.1 |

FOREIGN PATENT DOCUMENTS

| | | | | |
|---|---|---|---|---|
| EP | | 2632134 A1 * | 8/2013 | ............ H04M 1/576 |
| WO | WO 2013/182736 A1 | | 12/2013 | |
| WO | WO 2015/088123 A1 | | 6/2015 | |
| WO | WO 2015/132622 A1 | | 9/2015 | |

\* cited by examiner

MOBILE DEVICE AND METHOD OF CONTROLLING THEREFOR

This application claims the benefit of the Korean Patent Application No. 10-2015-0147255, filed on Oct. 22, 2015, which is hereby incorporated by reference as if fully set forth herein.

BACKGROUND OF THE INVENTION

Field of the Invention

The present invention relates to a mobile device and a method of controlling therefor. More particularly, when a phone call is received from a specific counterpart, the present invention relates to a mobile device determining whether to receive the phone call in the middle of checking additional information related to a specific application by displaying a screen including an execution screen of the specific application on the top of a reception screen and a method of controlling therefor.

Discussion of the Related Art

A mobile device is utilized to perform various functions in our daily lives in conjunction with various applications. According to the related art, if a phone call is received from a specific counterpart, a contact history and the number of contacts between the specific counterpart and a user are provided as well as information on a location and weather at which the user is located.

In addition, according to the related art, if a user receives a phone call in the middle of executing an application, it is difficult for the user to execute the application and receive the phone call at the same time. Hence, the user temporarily stops the application, receives the phone call and executes the application again after the phone call is finished, which inconveniences the user.

SUMMARY OF THE INVENTION

Accordingly, one aspect of the present invention is directed to an apparatus and method thereof that substantially obviate one or more problems due to limitations and disadvantages of the related art.

Another aspect of the present invention is to provide a mobile device capable of displaying a screen including an execution screen of a specific application on the top of a reception screen and differently executing such a phone call reception mode as a normal phone call mode, a phone call declining mode, a speakerphone mode and the like according to a screen length when a phone call is received from a specific counterpart and a method of controlling therefor.

Still another aspect of the present invention is to provide a mobile device capable of checking e-mail information received from a specific counterpart in real time by executing such a specific application as e-mail and making a call at the same time when a phone call is received from the specific counterpart and a method of controlling therefor.

Another aspect of the present invention is to provide a mobile device capable of diversifying a phone call declining method by automatically sending a declining message if a user does not answer the phone call for prescribed time, displaying a preview image on a screen if the user raises the mobile device toward a specific direction, capturing a front direction of a camera and transmitting the captured front image to a counterpart if a touch input for capturing is received from the user and a method of controlling therefor.

Yet another aspect of the present invention is to provide a mobile device capable of checking reservation information received from a specific counterpart in real time by executing such a specific application as a calendar and making a call at the same time when a phone call is received from the specific counterpart and the mobile terminal capable of automatically inputting the reservation information and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile device includes a wireless communication unit configured to transceive data with an external device, a controller configured to receive a call signal from the external device, the controller configured to display a second screen including contents of a specific application, which is executed in response to the received call signal, on a first screen corresponding to a current screen in a specific direction according to a touch input received from a user, the controller configured to change an application executed on the first screen according to the touch input received from the user, the controller configured to execute the changed application, wherein a specific mode is differently executed according to a screen length of the second screen and a display unit configured to display at least one of the first screen and the second screen according to a control command received from the controller.

To further achieve these objects and other advantages and in accordance with the purpose of the invention, as embodied and broadly described herein, according to a different embodiment, a method of controlling a mobile device can include the steps of receiving a call signal from an external device, displaying a second screen including contents of a specific application, which is executed in response to the received call signal, on a first screen corresponding to a current screen in a specific direction according to a touch input received from a user, changing an application executed on the first screen according to the touch input received from the user and executing the changed application. In this instance, a specific mode is differently executed according to a screen length of the second screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
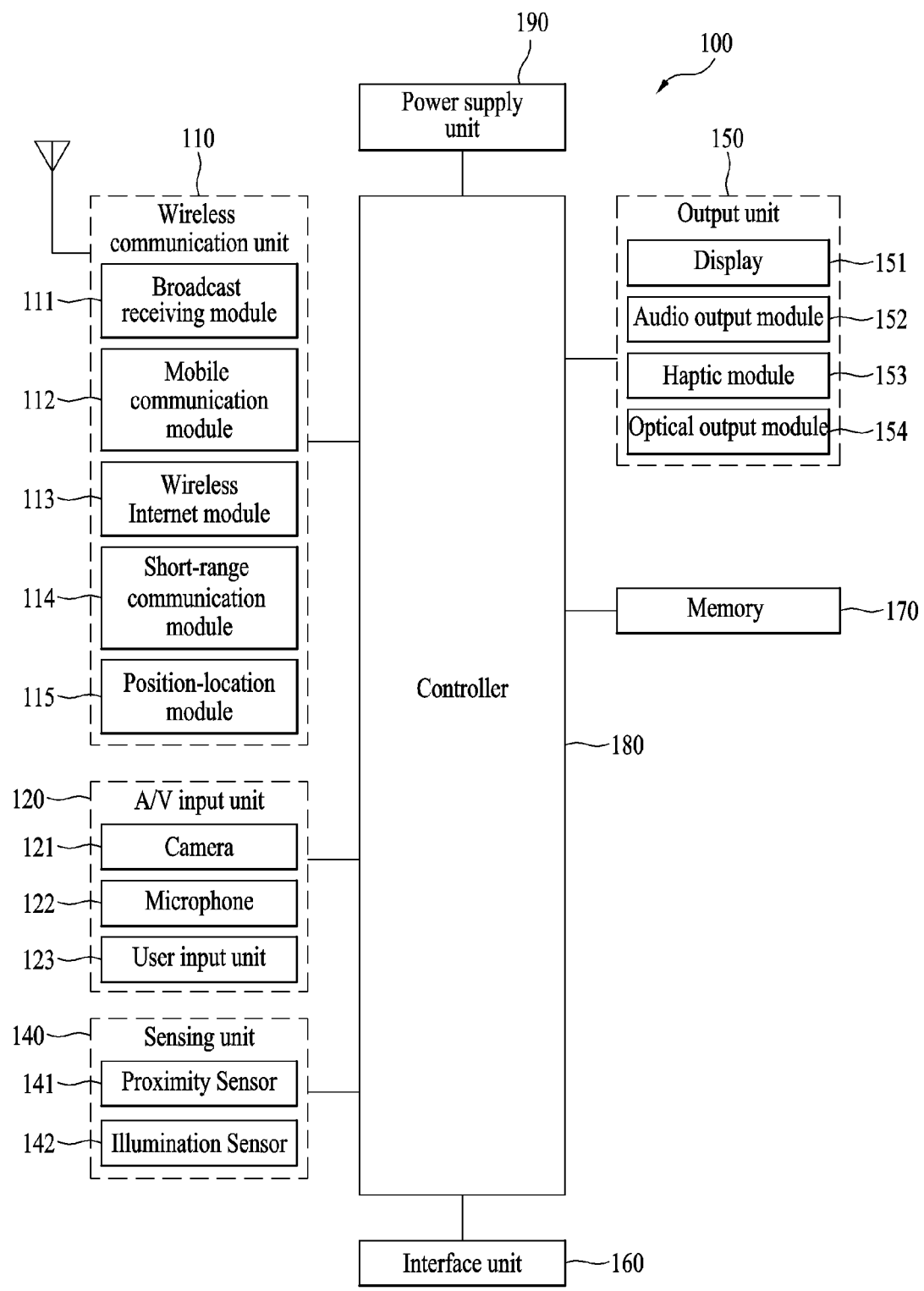
FIG. 1A is a block diagram illustrating explaining a mobile device related to the present invention.
Figure 1B:
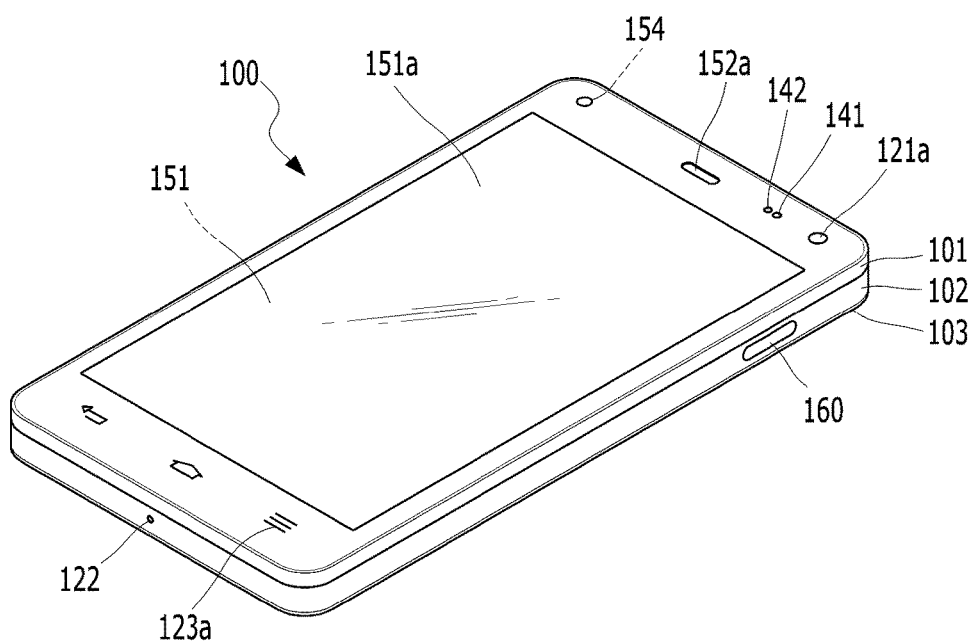
FIGS. 1B and 1C are conceptual diagrams illustrating a different view of one embodiment of a mobile device related to the present invention.
Figure 1C:
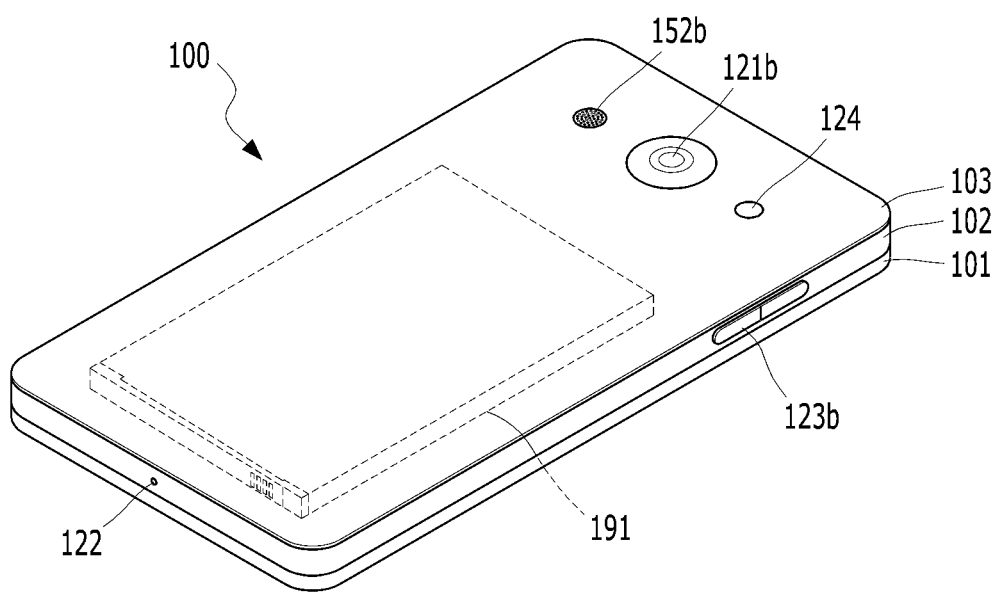

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof. A web search engine indicates a software system designed to search for information of WWW (World Wide Web). Before a market of a mobile terminal is expanded, users have used a service of the web search engine using a PC (personal computer).

Recently, as the use of a mobile terminal is rapidly increasing by disseminating a huge amount of smartphones, percentage of the use of a web search engine using the mobile terminal is also increasing. In case of using the service via a mobile terminal, it can not only access a web page of the web search engine using a web browser application but also access the web search engine via an application provided by the web search engine itself.

Meanwhile, services or contents provided on a web page have changed as well. Images or texts used to be provided on a legacy web page as main contents. Yet, not only the images or the texts but also such metadata as location information, tag information and the like are provided on a recent web page.

Location information corresponds to a geographical location. Similar to what is used in a GPS, the location information consists of longitude and latitude. Not only the longitude and the latitude, location information (address and the like) of an administrative district may correspond to the location information as well. For instance, in case of a web page displaying information on a specific restaurant, the web page can include a picture of the specific restaurant, a picture (image content) of food of the restaurant and explanation (text contents) on the pictures. Additionally, location of the restaurant can be included in the location information content.

As mentioned in the foregoing description, while the recent web page provides various contents, a search result provided by the web search engine does not include information on the contents, thereby causing inconvenience. Hence, one embodiment of the present invention described in the following proposes to provide the information on the various contents on a service provided by the web search engine. In the following, a specific embodiment is explained with reference to drawings.

Meanwhile, according to an embodiment of the present invention, information processed in a mobile terminal can be displayed using a flexible display. Regarding this, it is explained in more detail in the following with reference to the attached drawings.

Figure 2:
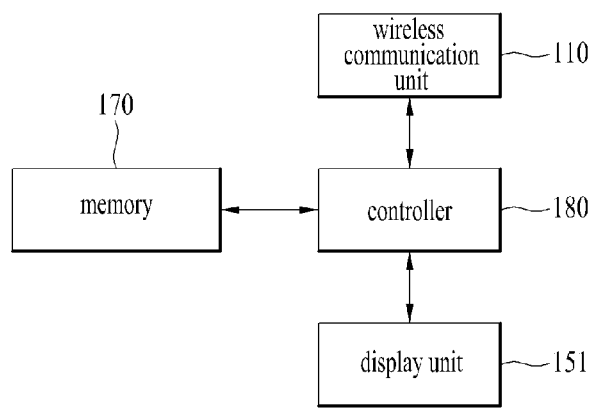
FIG. 2 is a configuration diagram illustrating a mobile device according to one embodiment of the present invention.

FIG. 2 is a configuration diagram illustrating a mobile device according to one embodiment of the present invention. As shown in FIG. 2, a mobile device 100 includes a wireless communication unit 110, a display unit 151, a memory 170 and a controller 180. The wireless communication unit 110 transceives data with an external device.

The display unit 151 displays at least one of a first screen and a second screen according to a control command received from the controller 180. Further, the memory 170 stores user information, execution content of an application corresponding to the user information, execution content of a specific application, a message and the like.

The controller 180 receives a call signal from an external device, displays a second screen including execution content of a specific application, which is executed in response to the received call signal, on a first screen indicating a current screen in a specific direction according to a touch input received from a user, changes an application executed on the first screen according to the touch input received from the user and executes a changed application. In this instance, a specific mode is differently executed according to a screen length of the second screen.

Figure 3:
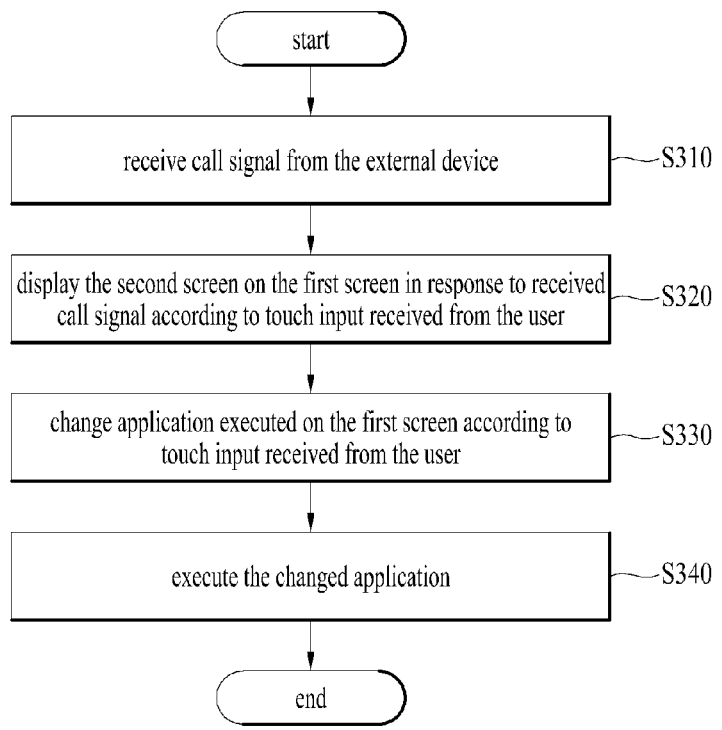
FIG. 3 is a flowchart illustrating a method of controlling a mobile device according to one embodiment of the present invention.

FIG. 3 is a flowchart illustrating a method of controlling a mobile device according to one embodiment of the present invention. As shown in FIG. 3, the controller 180 receives a call signal from an external device (S310). Subsequently, the controller 180 displays a second screen including execution content of a specific application, which is executed in response to the received call signal, is displayed on a first screen indicating a current screen in a specific direction according to a touch input received from a user (S320). The controller 180 then changes an application executed on the first screen according to the touch input received from the user (S330), and executes the changed application (S340).

In this instance, the controller 180 differently executes a specific mode according to the screen length of the second screen. Specifically, if the screen length corresponds to a specific length, the controller 180 executes a first mode and extends the screen length as much as a specific length. If a touch input heading toward a direction opposite to a direction to which the screen length is extended is received from a user within prescribed time, the controller executes a second mode. If the screen length is maximally extended, the controller executes a third mode.

Figure 4:
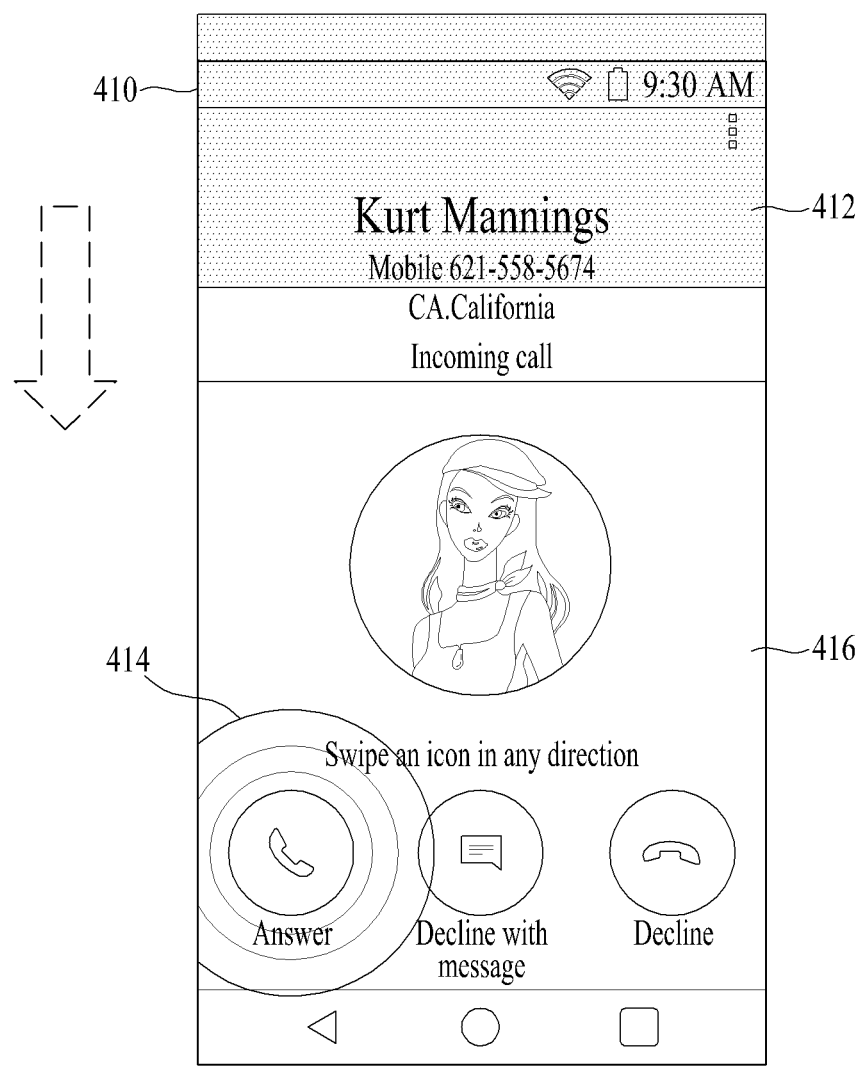
FIG. 4 is a flowchart illustrating a method of controlling a mobile device according to one embodiment of the present invention.

FIG. 4 is a diagram illustrating a basic configuration of a screen according to one embodiment of the present invention. As shown in the display screen 410, the controller 180 displays a second screen 412 on a first screen 416 indicating a current screen. The second screen 412 includes execution content of a specific application in response to a received call signal.

In more detail, the second screen 412 includes execution content of a specific application used by a user and a specific counterpart. In this instance, the specific application includes an e-mail application, an SNS service application such as KakaoTalk, Line, etc., a calendar application and the like.

If a touch input for downwardly dragging the second screen 412 is received from a user, the controller 180 displays the second screen 412 on the first screen 416. An application icon 414 indicates an application used by a user when the user makes a call. If an input on a call button is received from a user, the controller 180 executes an application corresponding to the icon.

Figure 5:
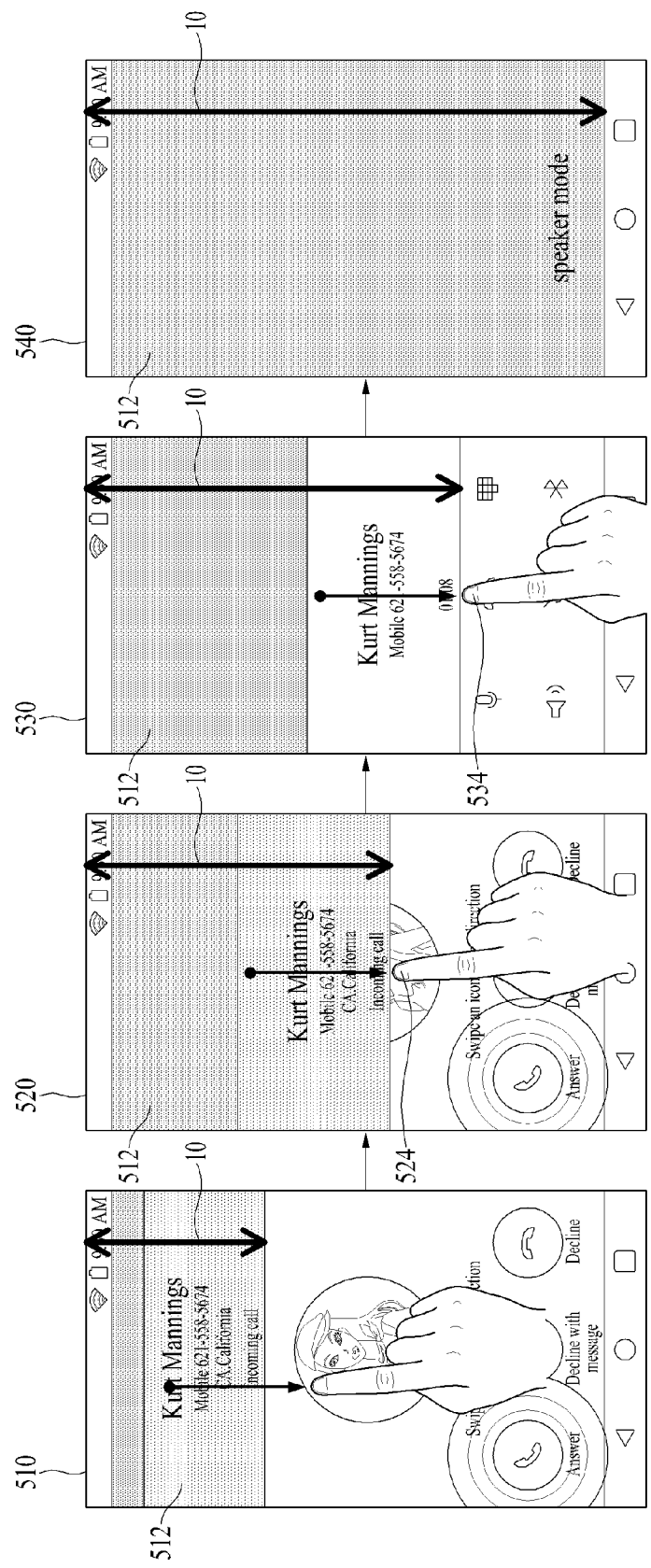
FIG. 5 is a diagram illustrating a method of changing a phone call reception mode according to a length of dragging a second screen according to one embodiment of the present invention.

Next, FIG. 5 is a diagram illustrating a method of changing a phone call reception mode according to a length of dragging a second screen according to one embodiment of the present invention. A screen length of the second screen is extended according to a dragging length of a user and a mode status is changed according to the screen length.

If the screen length 10 corresponds to a prescribed length, the controller 180 executes a first mode and extends the screen length to a prescribed length. If a touch input heading toward a direction opposite to a direction to which the screen is extended is received from a user within prescribed time, the controller 180 executes a second mode. If the screen length is maximally extended, the controller 180 executes a third mode.

In this instance, the first mode may correspond to a normal phone call mode, the second mode may correspond to a phone call declining mode and the third mode may correspond to a speakerphone mode. As shown in the display screen 510, if a call signal is received from an external device, the controller 180 displays a second screen 512 in the downward direction based on a touch and drag input. In this instance, a screen length 10 becomes a prescribed length.

As shown in the display screen 520, if a touch input 524 for downwardly dragging the second screen 512 is received from a user, the controller 180 displays the second screen 512 in the downward direction in response to the received touch input 524. In this instance, if the screen length 10 corresponds to the prescribed length, the controller 180 executes a hold mode. In this instance, the hold mode is not a state of receiving a phone call or a state of terminating a phone call. The hold mode corresponds to a mode of a hold state that a user is waiting for a phone call.

As shown in the display screen 530, if a touch input 534 for downwardly dragging the second screen 512 is received from a user and the screen length 10 is equal to or greater than the prescribed length, the controller 180 executes a normal reception mode. The normal reception mode corresponds to a state that a user can make a call using a mobile device in general.

As shown in the display screen 540, if a touch input for downwardly dragging the second screen 512 to the end is received from a user and the screen length 10 corresponds to a maximum length, the controller 180 executes a speaker mode. The speaker mode corresponds to a mode that a microphone and a speaker of a mobile device 100 are activated, voice of the user is received through the microphone and voice of a counterpart is output through the speaker.

Figure 6:
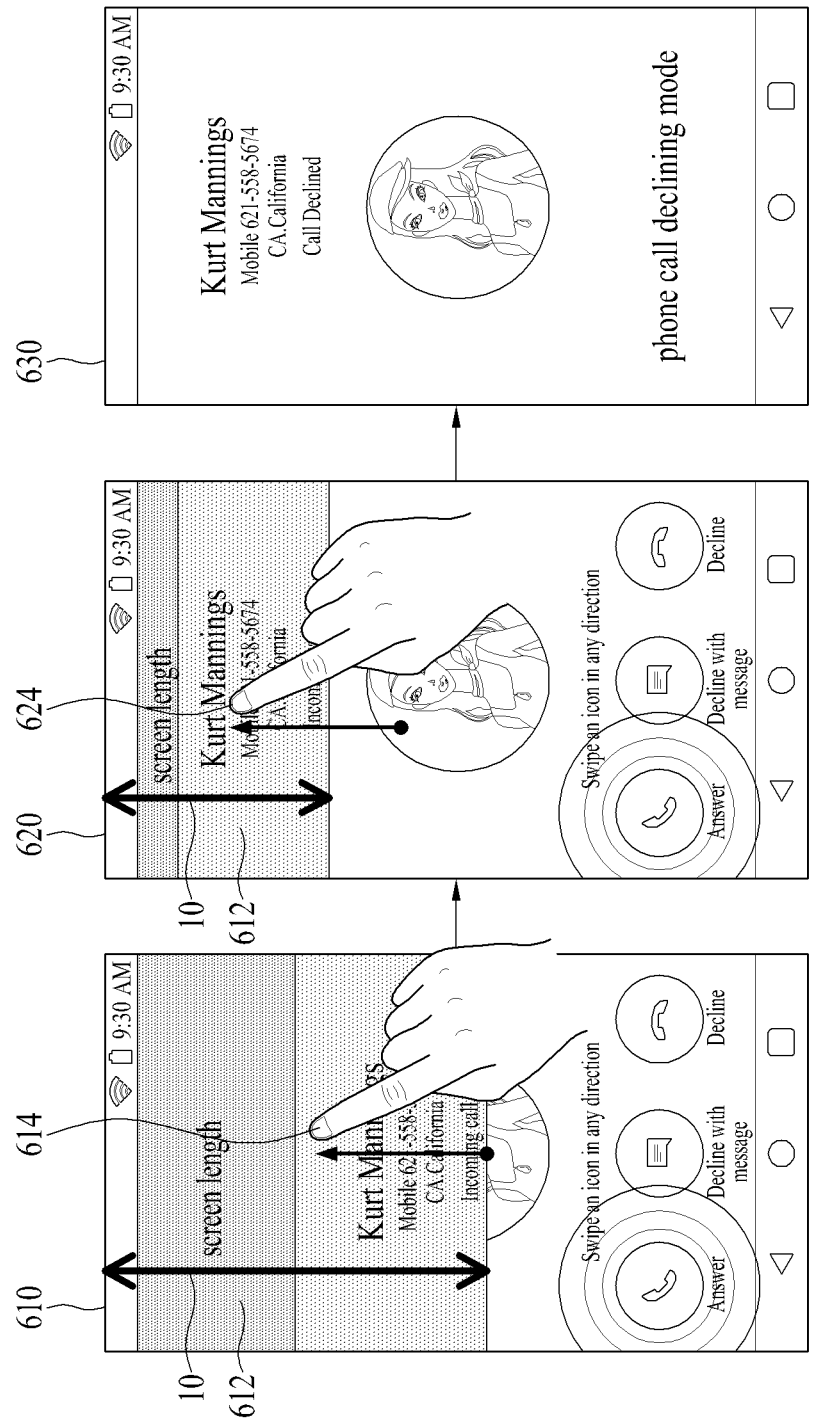
FIG. 6 is a diagram illustrating a method of executing a phone call declining mode by downwardly dragging and upwardly dragging a second screen according to one embodiment of the present invention.

Next, FIG. 6 is a diagram illustrating a method of executing a phone call declining mode by downwardly dragging and upwardly dragging a second screen according to one embodiment of the present invention. As shown in the display screen 610, a touch input for downwardly dragging a second screen 612 is received from a user.

As shown in the display screen 620, a touch input 624 for upwardly dragging the second screen 612 is received from a user within a prescribed time. The screen length 10 becomes short after being extended. As shown in the display screen 630, the controller 180 executes a phone call declining mode in response to the received touch input 624. In this instance, the phone call declining mode corresponds to the user not answering the received call signal.

Figure 7:
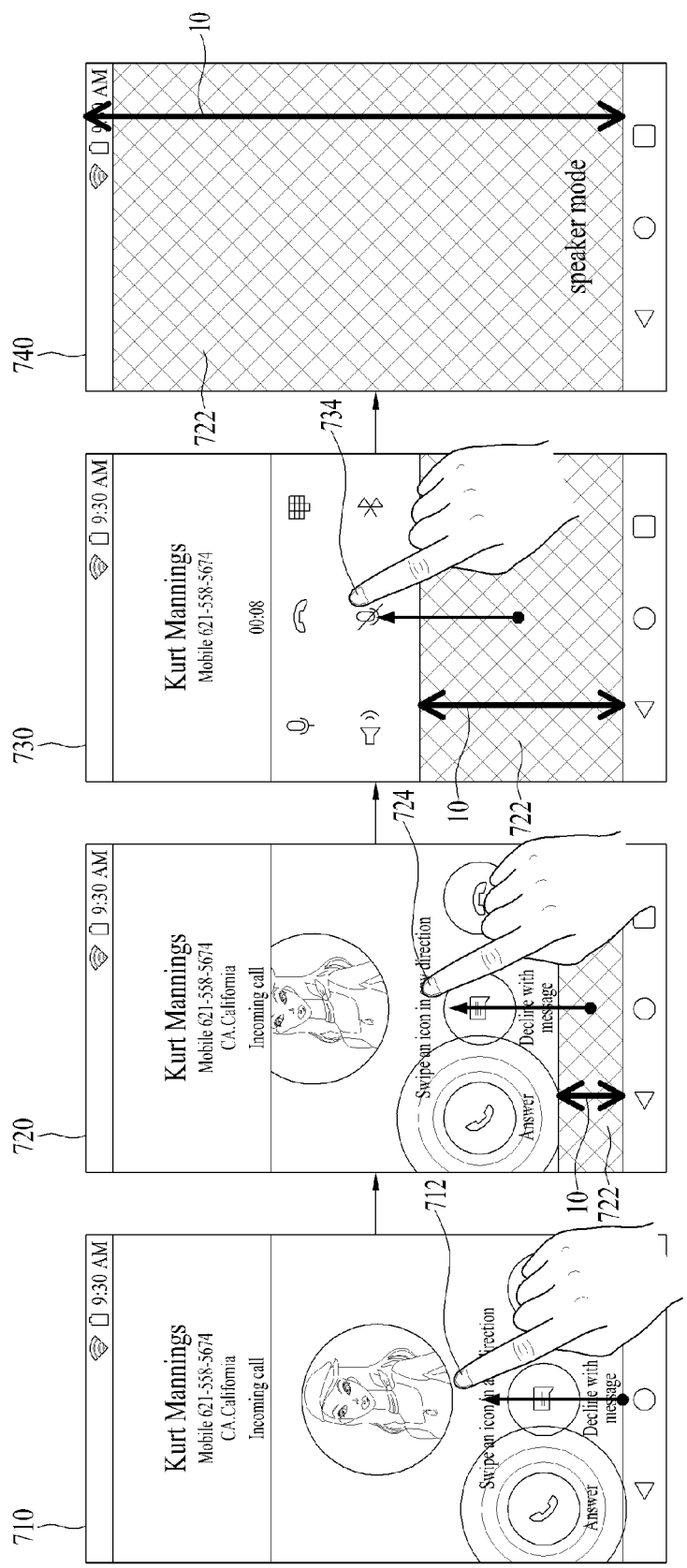
FIG. 7 is a diagram illustrating a method of changing a phone call reception status according to a length of dragging a second screen according to one embodiment of the present invention.

FIG. 7 is a diagram illustrating a method of changing a phone call reception status according to a length of dragging a second screen according to one embodiment of the present invention. A user can receive a phone call while executing a frequently used application. In this instance, a phone call reception mode is changed according to a screen length of a second screen.

As shown in the display screen 710, as a call signal is received from an external device, a touch input 712 is received from a user while a specific application of which number of use is equal to or greater than a prescribed number is executed. In this instance, the prescribed number may correspond to 5.

As shown in the display screen 720, if a touch input for upwardly dragging the second screen 722 is received from a user, the controller 180 continuously displays the second screen 722 in the upward direction. In this instance, if a screen length 10 corresponds to a prescribed length, the controller 180 executes a hold mode. Further, the hold mode corresponds to the user holding the call signal without blocking the call signal.

As shown in the display screen 730, if a touch input 734 for upwardly dragging the second screen 722 is received from the user and the screen length 10 is equal to or greater than the prescribed length, the controller 180 executes a normal reception mode. As shown in the display screen 740, if a touch input for upwardly dragging the second screen 722 to the end is received from a user and the screen length 10 corresponds to a maximum length, the controller 180 executes a speaker mode.

Figure 8:
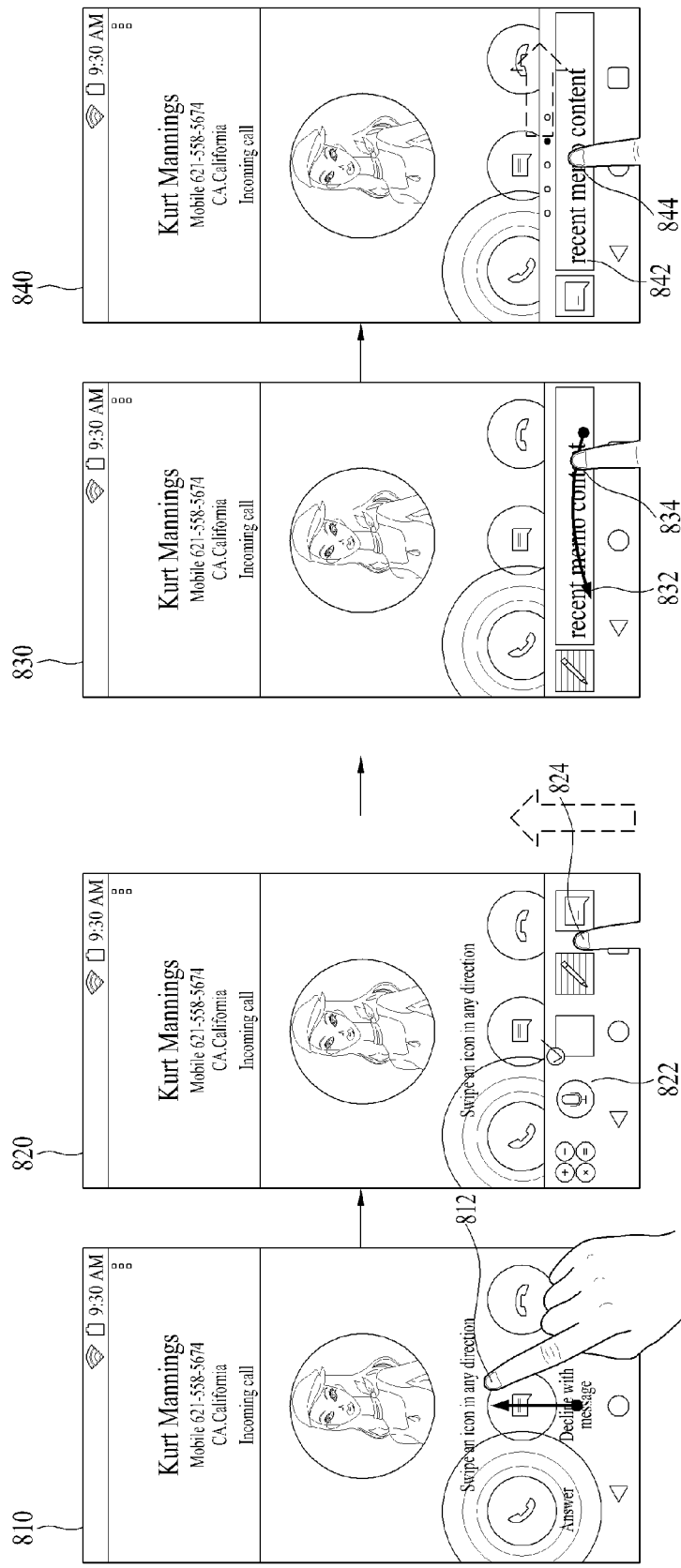
FIG. 8 is a diagram illustrating a method of changing an application, which is executed when a call signal is received, according to one embodiment of the present invention.

Next, FIG. 8 is a diagram illustrating a method of changing an application, which is executed when a call signal is received according to one embodiment of the present invention. If a touch input is received from a user, the controller 180 immediately executes a specific application. If a touch input in a specific direction is received from a user, the controller 180 can change an application to be executed.

As shown in the display screen 810, if a touch input 812 for dragging in an up direction is received from a user, the controller 180 prepares to execute a specific application frequently used by the user in response to the received touch input 812. In this instance, the specific application frequently used by the user corresponds to an application frequently used by the user while the user receives a phone call and a reference value of the number of use of the application corresponds to a value equal to or greater than 5.

As shown in the display screen 820, if a touch input 824 for upwardly dragging a first screen corresponding to a current screen is received from a user, the controller 180 displays a second screen 822 capable of selecting a changeable application on the first screen. In this instance, the second screen 822 corresponds to a screen including icons of a plurality of applications. The plurality of the applications include a calculator, a voice receiver, a calendar, a memo application and the like.

As shown in the display screen 830, if a touch input for touching a specific area of a second screen 832 is received from a user, the controller 180 executes an application corresponding to the specific area. In this instance, the second screen 832 corresponds to an execution screen of a currently executed application.

As shown in the display screen 840, if a touch input 844 for dragging a second screen 842 to the right or left is received from a user, the controller 180 changes an executed application. For example, when a currently executed application corresponds to a note application, if the touch input 844 for dragging the second screen 842 to the right is received from a user, the controller 180 changes the note application into a calendar application.

Figure 9:
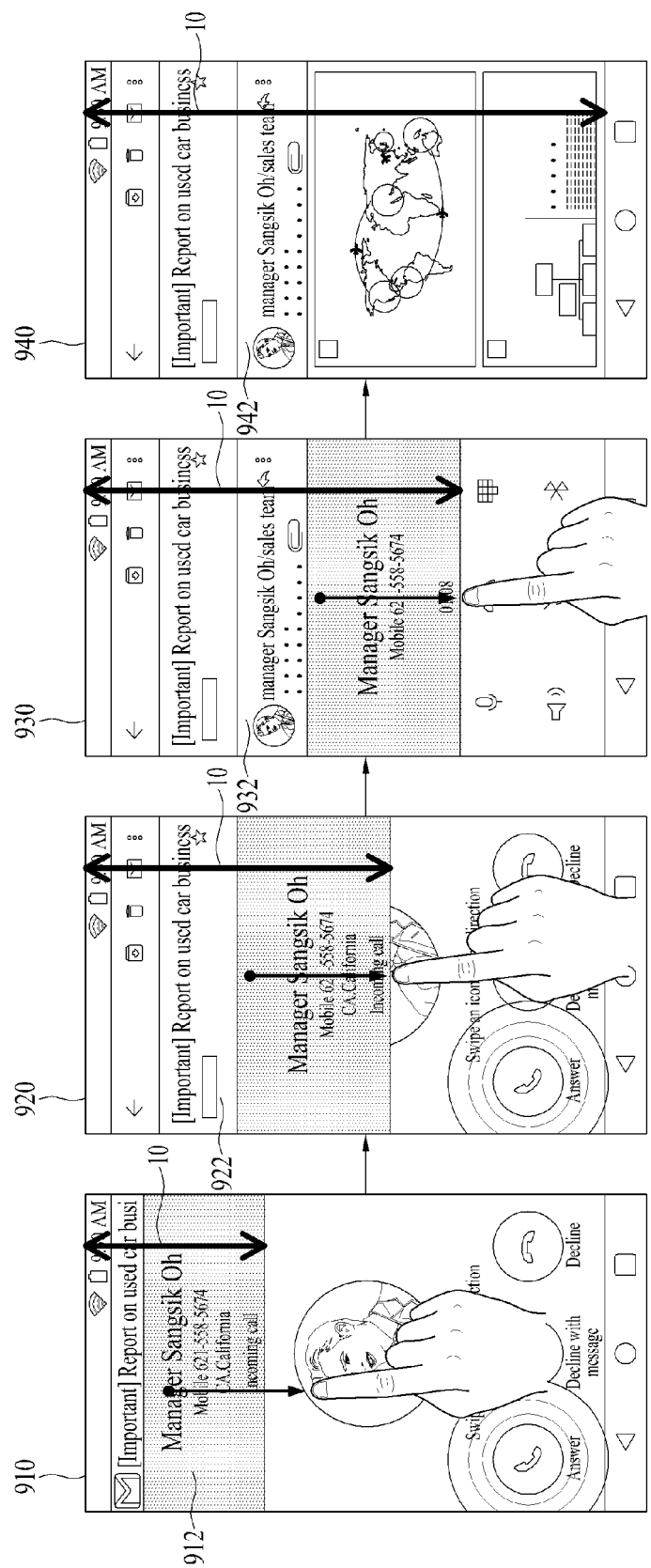
FIG. 9 is a diagram illustrating a method of changing a phone call reception mode according to a length of dragging a second screen according to one embodiment of the present invention.

FIG. 9 is a diagram illustrating a method of changing a phone call reception mode according to a length of dragging a second screen according to one embodiment of the present invention. As shown in the display screen 910, if a call signal is received from an external device, the controller 180 displays a second screen 912 in the downward direction according to a touch input 914 of a user. In this instance, the second screen 912 includes mail contents received from the external device corresponding to the received call signal. A screen length 10 varies according to a touch input of a user.

As shown in the display screen 920, if a touch input 924 for downwardly dragging the second screen 922 is received from a user, the controller 180 continuously displays the second screen 922 in the downward direction. In this instance, if a screen length 10 corresponds to a prescribed length, the controller 180 executes a hold mode. According to one embodiment of the present invention, the prescribed length may correspond to 5 cm.

As shown in the display screen 930, if a touch input 934 for downwardly dragging the second screen 932 is received from a user and a screen length 10 is equal to or greater than a prescribed length, the controller 180 can execute a normal reception mode. As shown in the display screen 940, if a touch input for downwardly dragging the second screen 942 to the end is received from a user and a screen length 10 corresponds to a maximum length, the controller 180 can execute a speaker mode.

Figure 10:
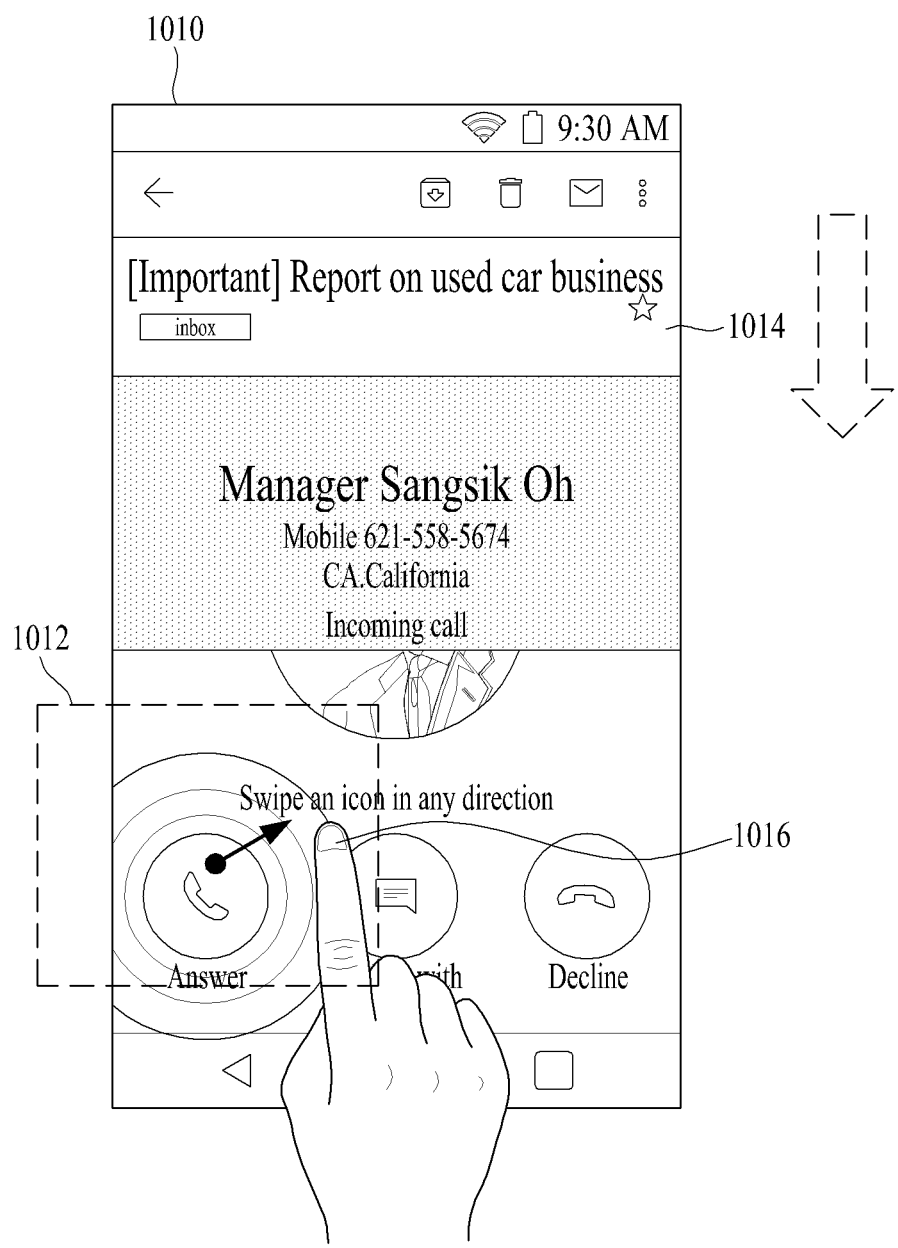
FIG. 10 is a diagram illustrating a method of checking a second screen by dragging a phone call reception icon according to one embodiment of the present invention.

FIG. 10 is a diagram illustrating a method of checking a second screen by dragging a phone call reception icon according to one embodiment of the present invention. As shown in the display screen 1010, if a call signal is received from an external device and a touch input for dragging a phone call reception icon 1012 in a specific direction is received from a user, the controller 180 displays a second screen 1014 in the downward direction. In this instance, the second screen 1014 includes mail contents received from the external device corresponding to the received call signal.

According to an embodiment of the present invention, if a touch input for dragging a phone call reception icon in a specific direction is received from a user, a second screen is displayed. Because the second screen can be displayed in various ways, the user's convenience is enhanced.

Figure 11:
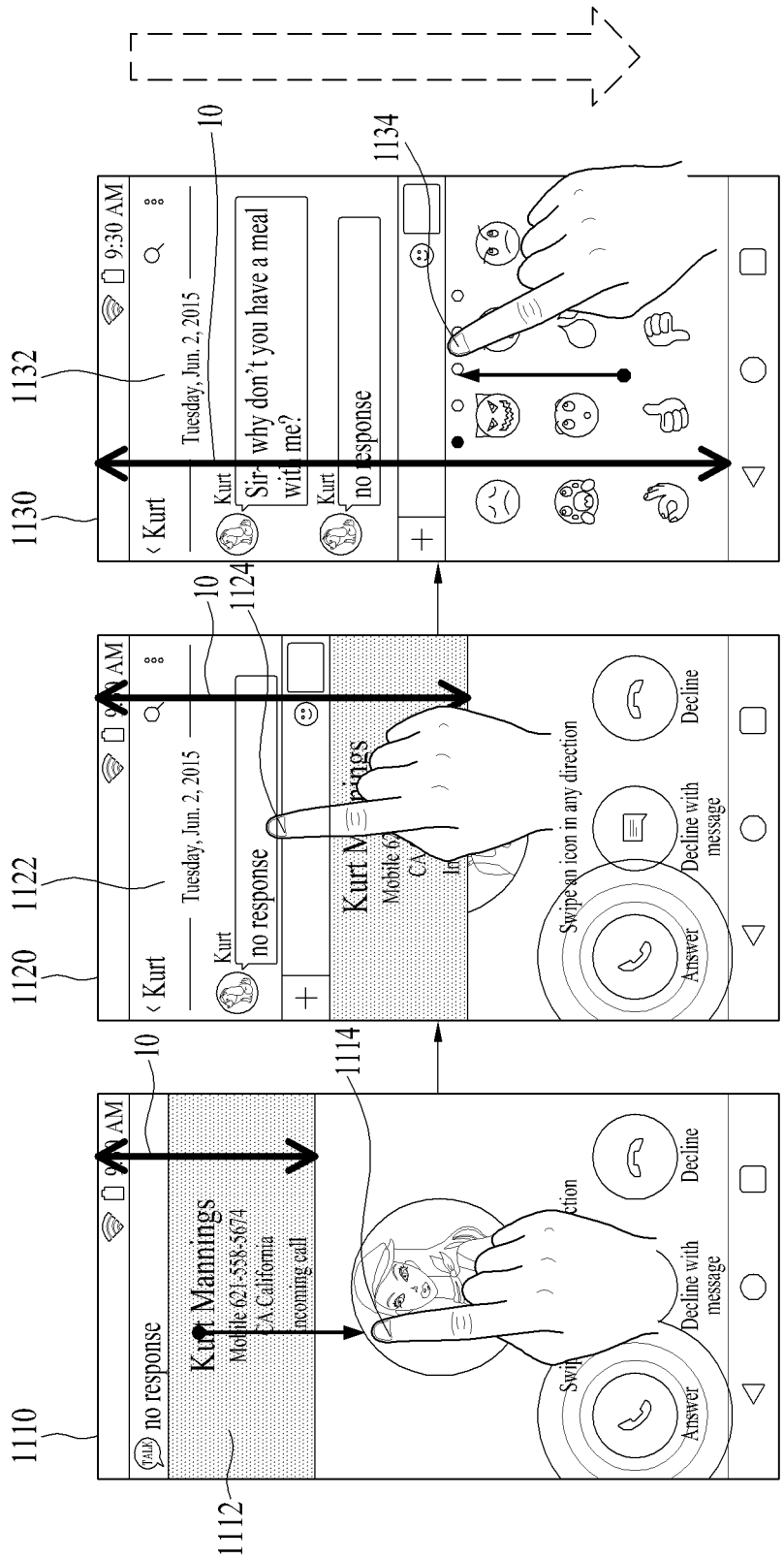
FIG. 11 is a diagram illustrating a method of dragging a second screen when a specific application is executed according to one embodiment of the present invention.

Next, FIG. 11 is a diagram illustrating a method of dragging a second screen when a specific application is executed according to one embodiment of the present invention. If a screen length is extended to a specific length when the specific application is executed, the controller 180 executes a normal phone call mode. If the screen length is extended to the specific length and a touch input in a direction opposite to a direction to which the screen length is extended is received from a user within a prescribed time, the controller executes a phone call declining mode. If the screen length is maximally extended, the controller executes a specific application mode.

As shown in the display screen 1110, if such a specific application as an SNS service application is executed and a specific message corresponding to the specific application is received from an external device, the controller 180 displays a second screen 1112 in the downward direction. In this instance, the second screen 1112 includes specific message contents received from the external device. In addition, the second screen 1112 can be displayed in the downward direction according to a touch input 1114 of a user. The screen length 11 also changes according to the touch input 1114 of the user.

As shown in the display screen 1120, if a touch input 1124 for downwardly dragging the second screen 1122 is received from a user, the controller 180 continuously displays the second screen 1122 in the downward direction. In this instance, if a screen length 10 corresponds to a prescribed length, the controller 180 executes a hold mode. According to one embodiment of the present invention, the prescribed length may correspond to 5 cm.

As shown in the display screen 1130, if a touch input for downwardly dragging a second screen 1132 to the end is received from a user and a screen length 10 corresponds to a maximum length, the controller 180 executes a specific application such as an SNS service application.

Figure 12:
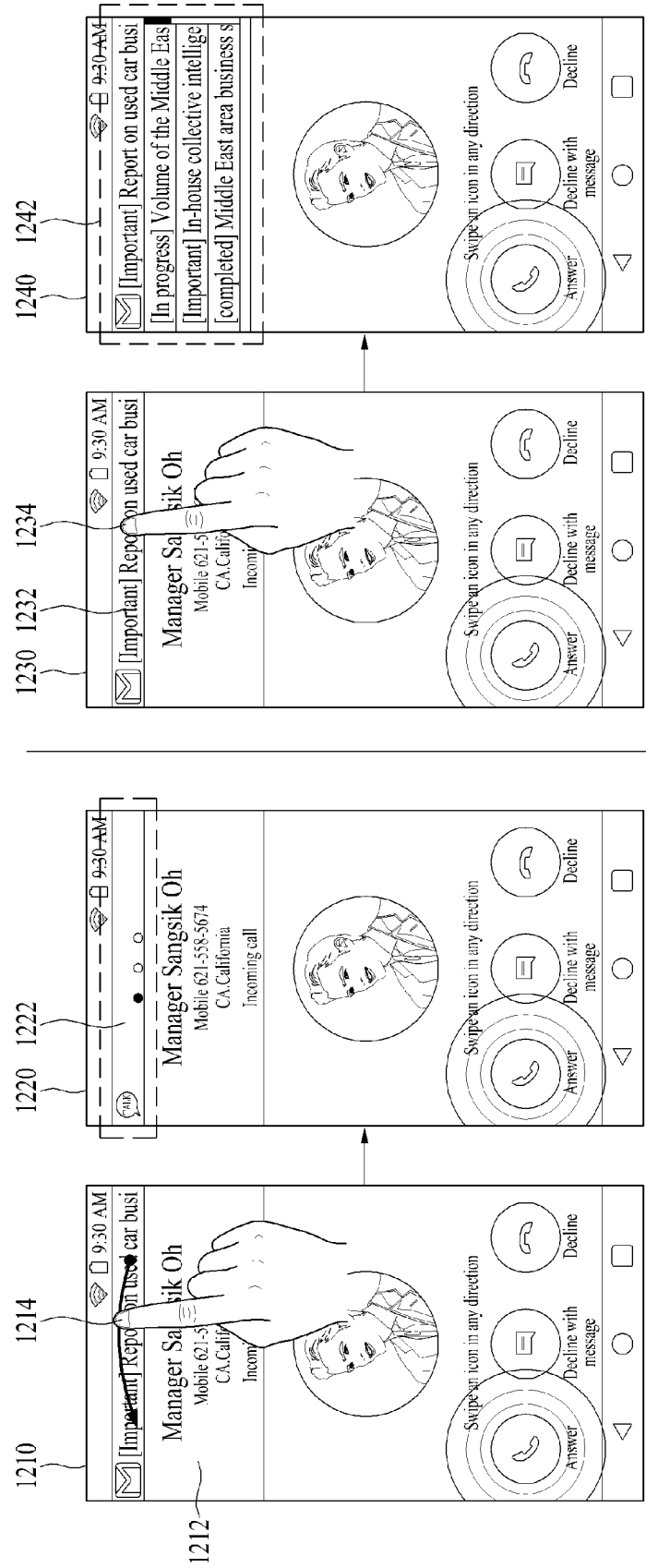
FIG. 12 is a diagram illustrating a method of changing an application by turning a second page to the left and the right and a method of displaying a list by touching a specific part of the second screen according to one embodiment of the present invention.

FIG. 12 is a diagram illustrating a method of changing an application by turning a second page to the left and the right and a method of displaying a list by touching a specific part of the second screen according to one embodiment of the present invention. If an input for touching a specific area of a second screen is received from a user for more than a prescribed time, the controller 180 displays a list related to the specific area on the second screen.

As shown in the display screen 1210, a specific application is executed and a touch input 1214 for dragging a specific area in the right or the left direction is received from a user. As shown in the display screen 1220, the controller 180 changes an application executed on a second screen into a specific SNS application 1222 from an e-mail application 1212.

As shown in the display screen 1230, a specific application such as an e-mail application is executed and a touch input 1234 for pushing such a specific area of a second screen 1232 as an e-mail title for prescribed time is received from a user.

As shown in the display screen 1240, the controller 180 displays a list 1242 related to a specific area of a second screen in response to a received touch input. For example, if a part corresponding to the specific area of the second screen corresponds to an e-mail application, the list related to the specific area may correspond to a list of e-mails received from a sender of a specific mail.

When a mail is received from Manager Oh, as shown in the embodiment 1230, if an input for touching a specific part of a screen on which an e-mail application is to be executed is received from a user, as shown in the embodiment 1240, a list of e-mails sent by the Manager Oh is displayed.

Figure 13:
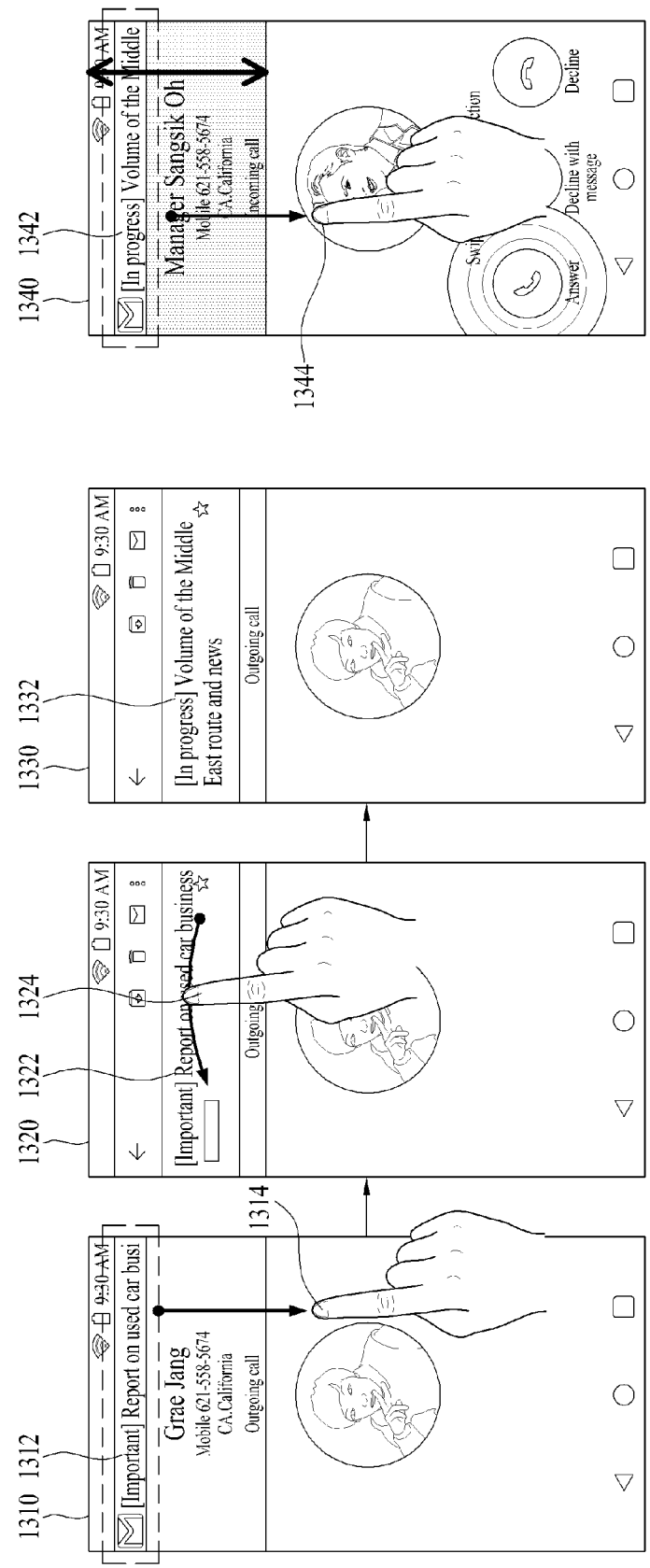
FIG. 13 is a diagram illustrating a second screen on which a relevant mail is referred to by a sender and a receiver when the sender transmits a mail to the receiver and makes a call to the receiver according to one embodiment of the present invention.

Next, FIG. 13 is a diagram illustrating a second screen on which a relevant mail is referred to by a sender and a receiver when the sender transmits a mail to the receiver and makes a call to the receiver according to one embodiment of the present invention. When a text is transmitted to an external device using a specific application and a call signal is transmitted to the external device, the controller 180 displays a second screen related to the text on a first screen. That is, when Manager Oh transmits a text mail to a staff member Jang using a mobile device and calls the staff member Gang using the same mobile device, the Manager Oh is talking with the staff Jang while looking at the text mail sent by the Manager Oh.

As shown in the display screen 1310, the controller 180 transmits a text mail 1312 to an external device using a specific application. If a touch input 1314 input in the downward direction is received from a user, the controller 180 displays the text mail 1312 by unfolding the text mail. As shown in the display screen 1320, when a sender makes a call to a receiver, a second screen 1322 including an execution screen of a specific application is displayed on a screen of the sender. A touch input 1324 for dragging the second screen 1322 in the right or the left direction is received from a user.

As shown in the display screen 1330, the controller 180 changes contents of a specific application executed on the second screen 1332 into second contents from first contents in response to the received touch input 1324. That is, when the specific application corresponds to an e-mail application, if a touch input for dragging the second screen in the right direction is received from a user, the controller 180 displays a different e-mail sent from the user on the second screen 1332.

As shown in the display screen 1340, if a receiver receives a phone call from a sender, i.e., if a call signal is received from an external device, a specific application is executed on a screen of the receiver and the controller 180 displays contents of the specific application on the second screen 1342. If a touch input for dragging the second screen 1342 in the downward direction is received from a user, the controller 180 displays contents of the second screen 1342 by unfolding the contents of the second screen. That is, if a sender sends an e-mail to a receiver using a mobile device and makes a call to the receiver, the mail sent by the sender is displayed on a second screen of a mobile device of the receiver.

According to an embodiment of the present invention, if a sender sends an e-mail to a receiver and makes a call to the receiver, it can display identical e-mail contents on a screen of the sender and a screen of the receiver at the same. Hence, since it is able for the sender and the receiver to talk on the phone while looking at the same e-mail contents, thereby increasing user convenience.

Figure 14:
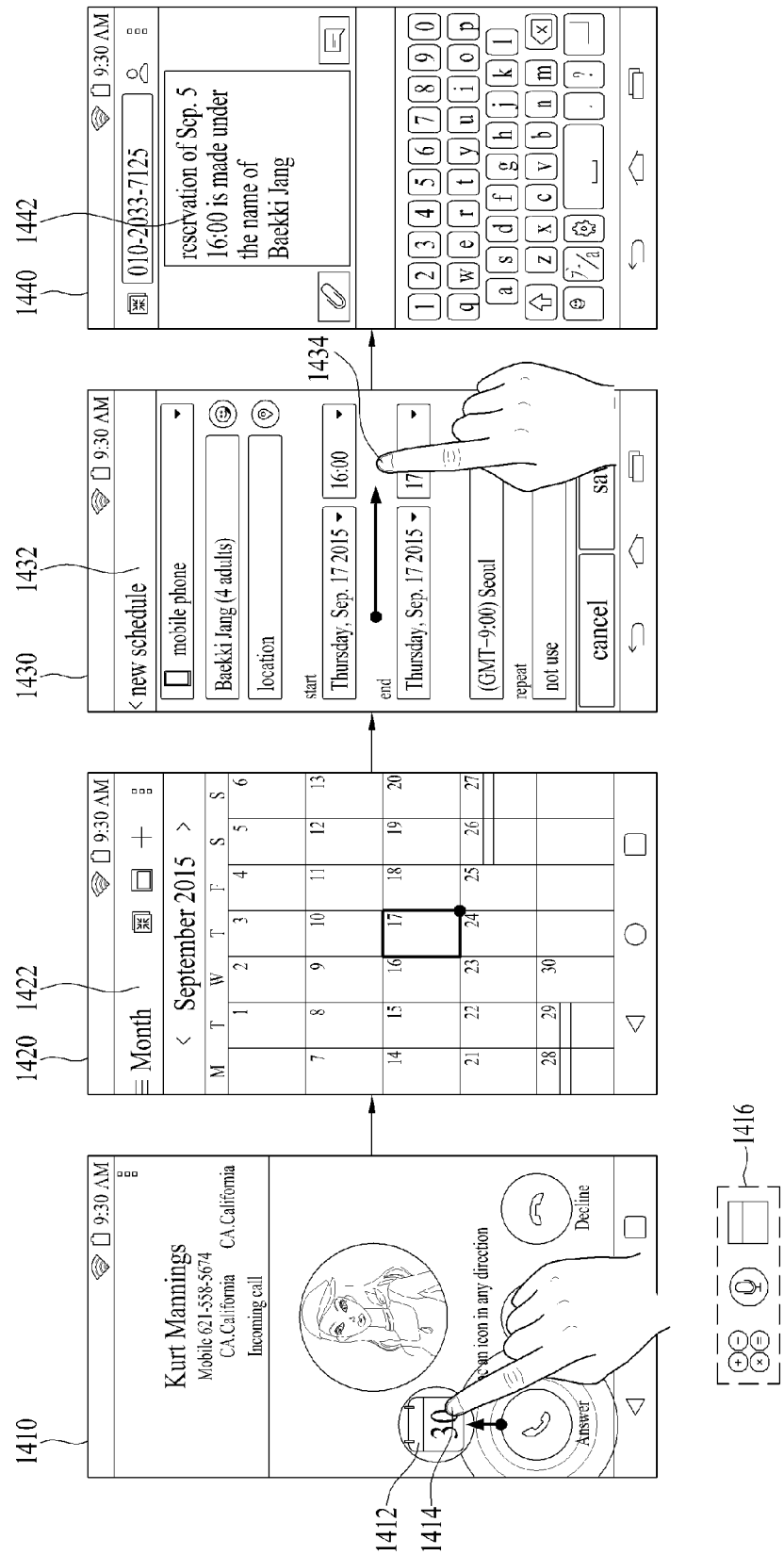
FIG. 14 is a diagram illustrating a method of executing a frequently executed application and receiving a phone call when a user receives the phone call according to one embodiment of the present invention.

Next, FIG. 14 is a diagram illustrating a method of executing a frequently executed application and receiving a phone call according to one embodiment of the present invention. The controller 180 stores a specific application, which is executed when a call signal is received from an external device and the number of executing the specific application is equal to or greater than a prescribed number, in a memory. If a call signal is received from an external device, the controller executes the stored specific application.

If there is a plurality of specific applications of which the number of execution is equal to or greater than a prescribed number, the controller 180 generates a folder 1412 for storing a plurality of the specific applications. If a touch input 1414 for touching the generated folder is received from the user, the controller 180 executes a plurality of the specific applications at the same time.

If a touch input in a specific direction is received from a user, the controller 180 displays a screen on which a second application, which is different from a currently executed first application, is executed. As shown in the display screen 1410, a restaurant can receive a reservation inquiry call from an external customer. For example, contents of the reservation inquiry call may include 'Yes, this is Outback. Four adults on September 17? Yes, reservation is available'.

In this instance, when a call signal is received from an external device, the controller 180 stores a calendar application of which the number of execution is equal to or greater than a prescribed number in the memory 170. In this instance, the prescribed number may correspond to 5.

As shown in the display screen 1420, the controller 180 executes the calendar application 1422 stored in the memory 170. As shown in the display screen 1430, a restaurant receives a reservation inquiry call from an external customer and can then answer as follows. For example, it can answer like 'Yes, your reservation is made under the name of Baekki Jang and it starts from 4 P.M.' The controller 180 receives a touch input 1434 input in the right direction from a user.

As shown in the display screen 1440, the controller 180 displays a screen 1442 on which a message input application, which is different from a currently executed schedule application 1432, is executed in response to the received touch input 1434. And, if a user looks away from the mobile device, a normal reception mode is automatically switched to a speaker mode. Specifically, if an amount of brightness increase detected by an illumination sensor within a prescribed time is equal to or greater than such a reference value as 80 lux, the controller 180 automatically switches a mode into the speaker mode.

Specifically, if a user moves their face closer to the mobile device to make a call using the mobile device, since it is difficult for the illumination sensor to detect light, brightness of the light is low. If the user moves their face from the mobile device due to a different reason, since it is easy for the illumination sensor to detect the light, an amount of brightness rapidly increases.

Figure 15:
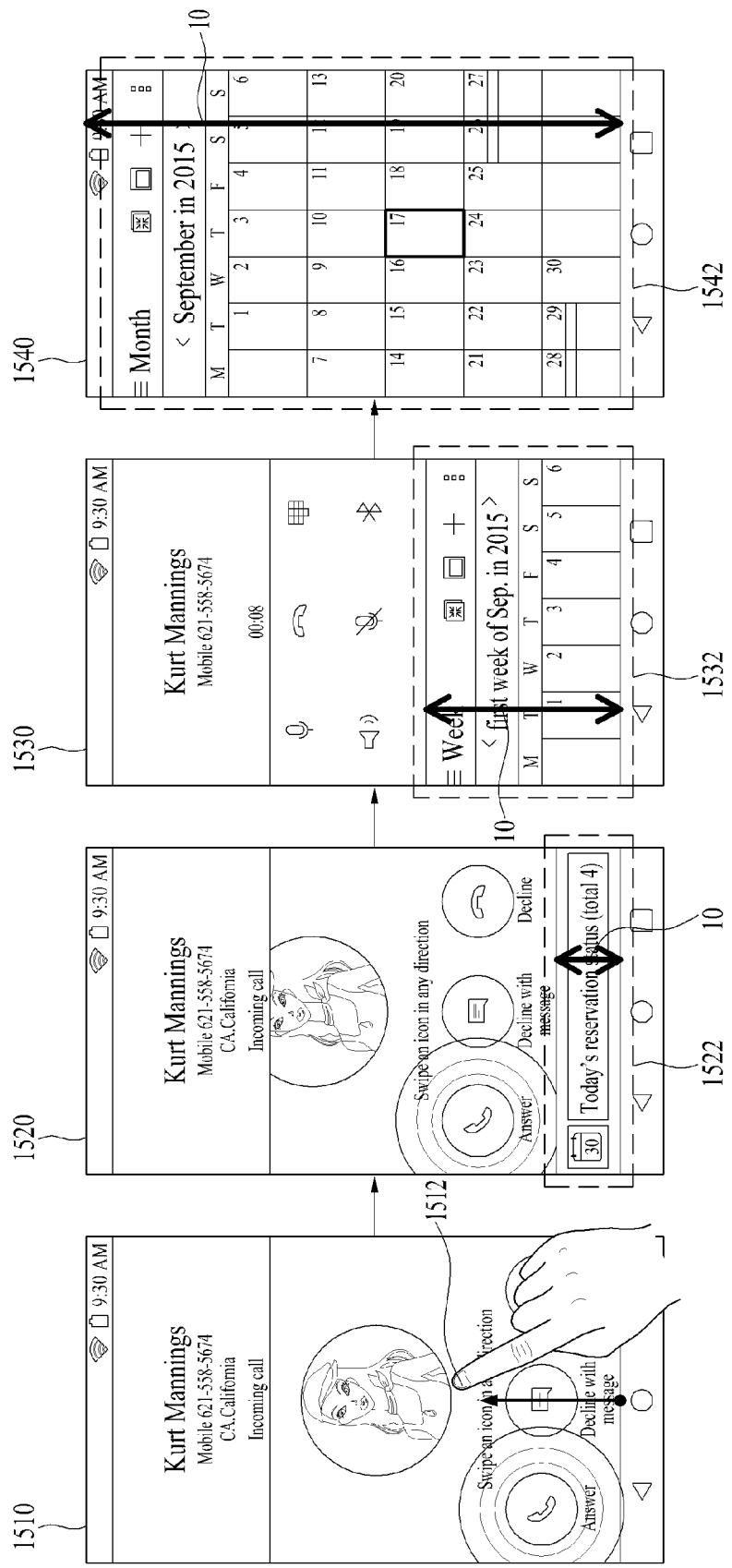
FIG. 15 is a diagram illustrating a method of checking simple information only or checking detail content when a frequently executed application is executed in the middle of making a call according to one embodiment of the present invention.

Next, FIG. 15 is a diagram illustrating a method of checking simple information only or checking detail content when a frequently executed application is executed in the middle of making a call according to one embodiment of the present invention. The controller 180 stores a specific application of which number of use is equal to or greater than a reference value in the memory 170. If a touch input for executing the specific application is received from a user, the controller 180 executes the specific application and differently controls a length of an execution screen of the application according to a screen length.

As shown in the display screen 1510, a restaurant may frequently receive a reservation inquiry call from an external customer. When a call signal is received from an external device, the controller 180 stores a calendar application of which the number of execution is equal to or greater than a prescribed number in the memory 170 and receives the call signal from the external device. After the call signal is received, the controller executes the calendar application stored in the memory 170 in response to a touch input 1512 of a user. In this instance, the prescribed number may correspond to 5 times.

As shown in the display screen 1520, if a screen length 10 is shorter than a prescribed length, the controller 180 can display a today's reservation status 1522 by controlling a length of an execution screen of the calendar application to be shortened. In this instance, a phone call mode may correspond to a hold mode. In this instance, the prescribed length may correspond to 5 cm.

As shown in the display screen 1530, if a screen length 10 of a second screen corresponds to a prescribed length, the controller 180 can display a week-unit reservation status 1532 by controlling a length of an execution screen of a calendar application. In this instance, a phone call mode may correspond to a normal reception mode.

As shown in the display screen 1540, if a screen length 10 corresponds to a length of a whole screen, the controller 180 can display a month-unit reservation status 1542 by controlling a length of an execution screen of a calendar application. In this instance, a phone call mode may correspond to a speaker mode.

According to an embodiment of the present invention, a user can store an application frequently used at the time of receiving a phone call in a specific list. A user executes a specific application while receiving a phone call and can check such simple information as today's reservation status or detail information as total reservation status, thereby increasing user convenience.

Figure 16:
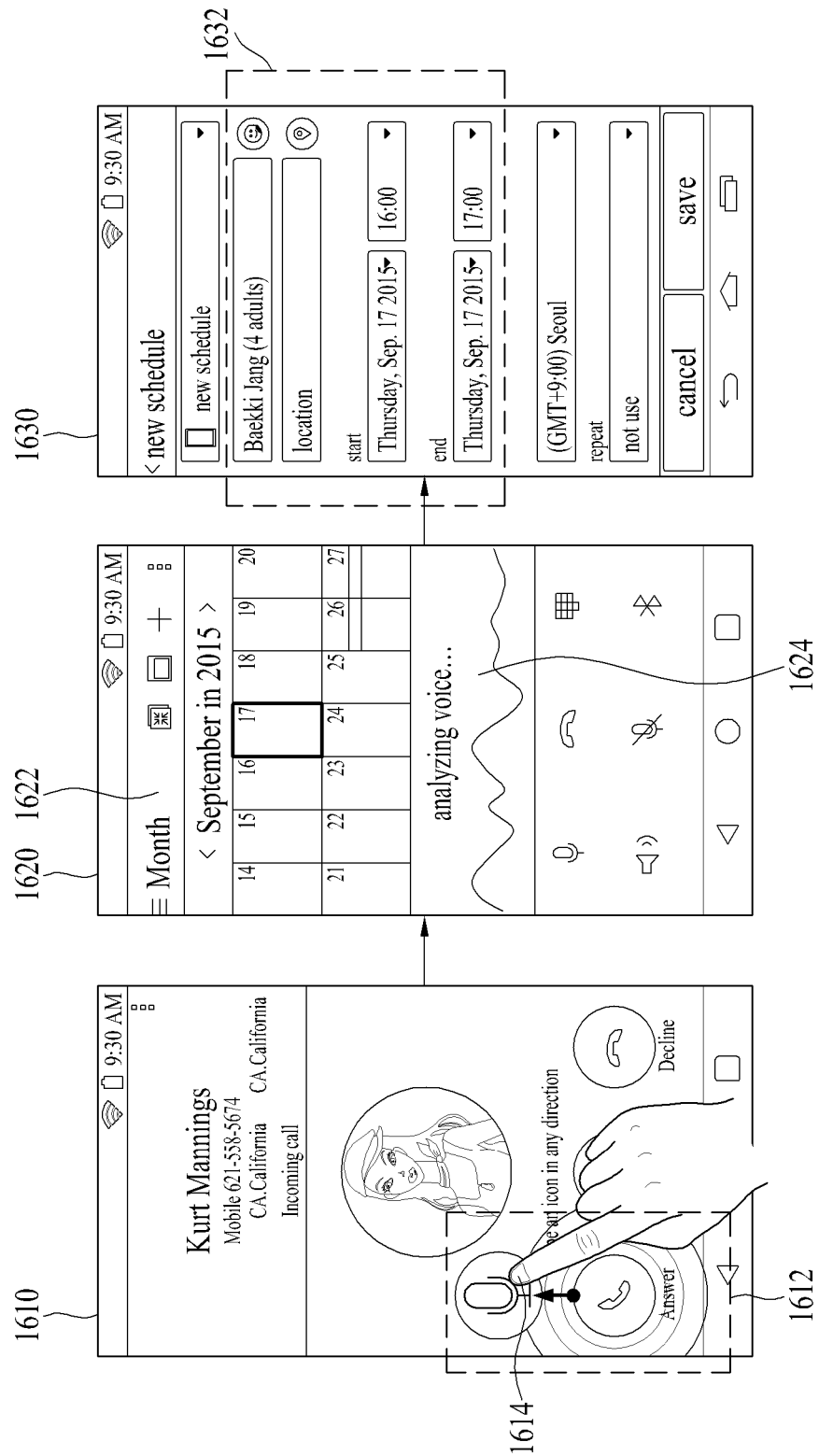
FIG. 16 is a diagram illustrating a method of automatically inputting specific content among a telephone conversation of a user using a voice recognition application according to one embodiment of the present invention.

Next, FIG. 16 is a diagram illustrating a method of automatically inputting specific content among a telephone conversation of a user using a voice recognition application according to one embodiment of the present invention. If a specific application recognizing voice is executed and voice including a specific word is received from a user, the controller 180 analyzes the voice using the specific application, extracts the specific word from the analyzed voice and inputs a text including the extracted specific word to an input message box.

As shown in the display screen 1610, if a touch input 1614 for executing a specific application is received from a user, the controller 180 executes the specific application recognizing voice, e.g., Q-voice application 1612, and receives voice including a specific word from the user. As shown in the display screen 1620, the controller 180 analyzes voice using the Q-voice application 1624 and extracts a specific word from the analyzed voice.

For example, the controller 180 extracts such a word as September 17, Baekki Jang, Four adults, 4 P.M. from the voice including 'Yes, this is Outback. Four adults on September 17? Yes, reservation is available.''Yes, your reservation is made under the name of Baekki Jang and it starts from 4 P.M.'. The controller 180 recognizes contents from the extracted specific words and executes a calendar application 1622 related to the contents.

As shown in the display screen 1630, the controller 180 automatically inputs a text 1632 including the extracted specific words to an input message box. For example, the controller inputs the text 1632 including Baekki Jang, Four adults, Sep. 17, 2015 Thursday 16:00 and the like to the input message box.

Figure 17:
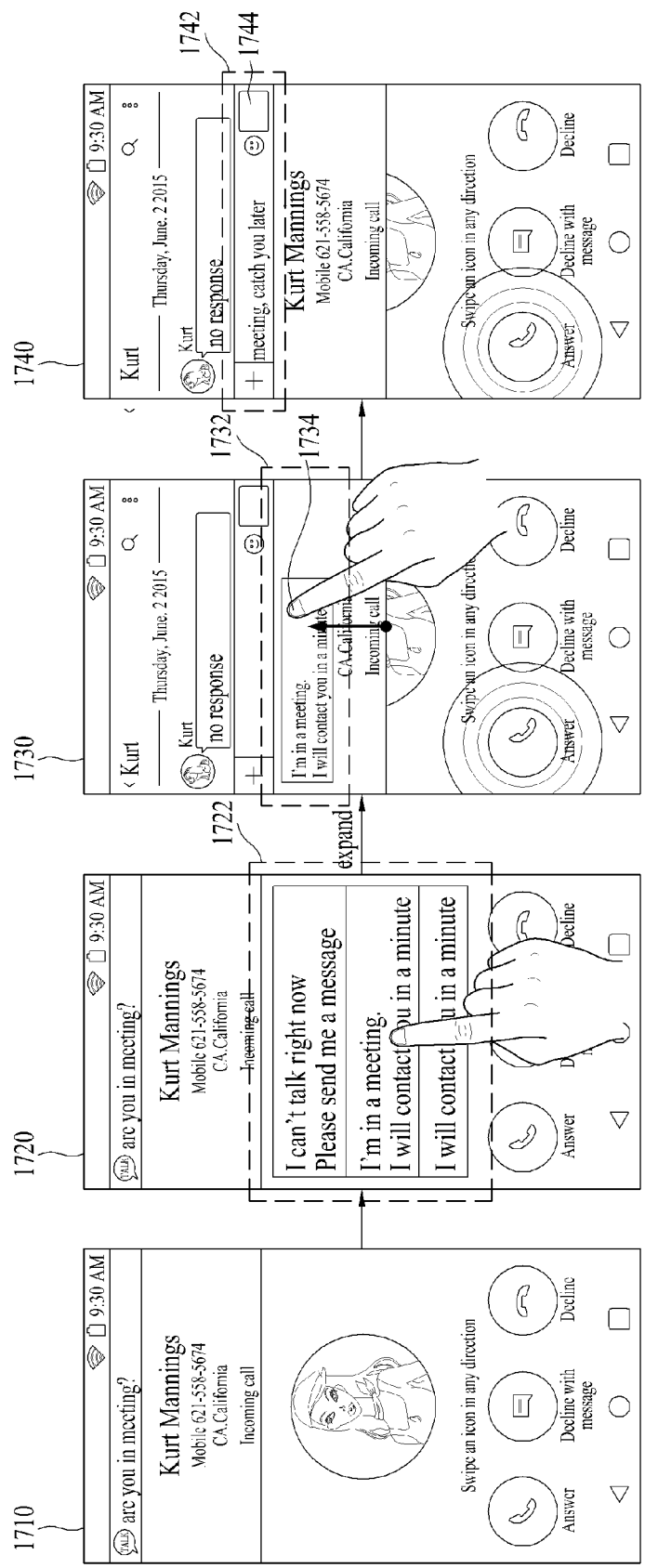
FIG. 17 is a diagram illustrating a method of automatically transmitting a declining message if a user does not answer the phone for prescribed time according to one embodiment of the present invention.

FIG. 17 is a diagram illustrating a method of automatically transmitting a declining message if a user does not answer the phone for prescribed time according to one embodiment of the present invention. If a call signal is received from external device for more than prescribed time, the controller 180 displays a message box including a specific message, receives an input for selecting the specific message from a user and transmits the specific message to the external device.

If a drag and drop input on an execution screen of a specific application is received from a user, the controller 180 transmits a specific message to an external device using the specific application. The controller 180 acquires information on a receiver including a telephone number of the receiver from the memory 170, determines a priority based on the acquired information on the receiver, generates a specific text based on the determined priority and a first specific message corresponding to a specific message and transmits a second specific message including the generated specific message to an external device.

The controller 180 determines the priority based on text message contents corresponding to the information on the receiver. As shown in the display screen 1710, the controller 180 executes such a specific application as KakaoTalk and receives a call signal from an external device for more than prescribed time. In this instance, the prescribed time may correspond to 15 seconds.

As shown in the display screen 1720, if a response is not received from a user in response to a received call signal within prescribed time, the controller 180 displays a message box 1722 including a declining message on a screen. Contents of the declining message can include 1) I can't talk right now. Please send me a message, 2) I'm in a meeting. I will contact you in a minute, 3) I will contact you in a minute, and the like.

As shown in the display screen 1730, the controller 180 receives a drag and drop input for dragging and dropping a specific message such as 'I'm in a meeting. I will contact you in a minute' to a specific position of a specific application from a current position input on an execution screen of the specific application from a user. As shown in the display screen 1740, if a specific message is dragged into an execution screen of a specific application and an input 1744 for touching a send icon is received from a user, the controller 180 transmits the specific message to an external device using the specific application.

According to one embodiment of the present invention, message contents can be differently changed depending on a receiver. That is, if a receiver corresponds to a person in a close relationship with a user, it may use a familiar talk rather than a polite and formal honorific. Whether a receiver is in a close relationship with a user can be determined based on a priority. The priority may become 1 or 2. If the priority corresponds to 2, since the priority is high, it indicates that a receiver is in a close relationship with a user. On the contrary, if the priority corresponds to 1, since the priority is low, it indicates that a receiver is not in a close relationship with a user.

For example, As shown in the display screen 1730, if a receiver is not in a close relationship with a user, a text message 1732 includes such polite message content as 'I am in a meeting. I will contact you in a minute'. As shown in the display screen 1740, if a receiver is in a close relationship with a user, a text message 1742 includes such friendly message content and an emoticon as 'Meeting, catch you later AA'.

Specifically, the controller 180 acquires 010-1588-5670 corresponding to a telephone number of a receiver and information on receivers including a staff Youngee Ahn from the memory 170 and determines a priority based on the information on the receivers. The controller 180 determines a priority as 2 based on text message contents corresponding to the information on the receivers. That is, the controller 180 determines as a staff Grae Gang and a staff Youngee Ahn are in a close relationship based on the text message content stored in the memory 170 and determines the priority as 2.

The controller 180 generates such a second specific message as 'meeting, catch you later ^^' based on the determined priority 2 and such a first specific message as 'I'm in a meeting. I will contact you in a minute' and transmits the generated second specific message to an external device.

Figure 18:
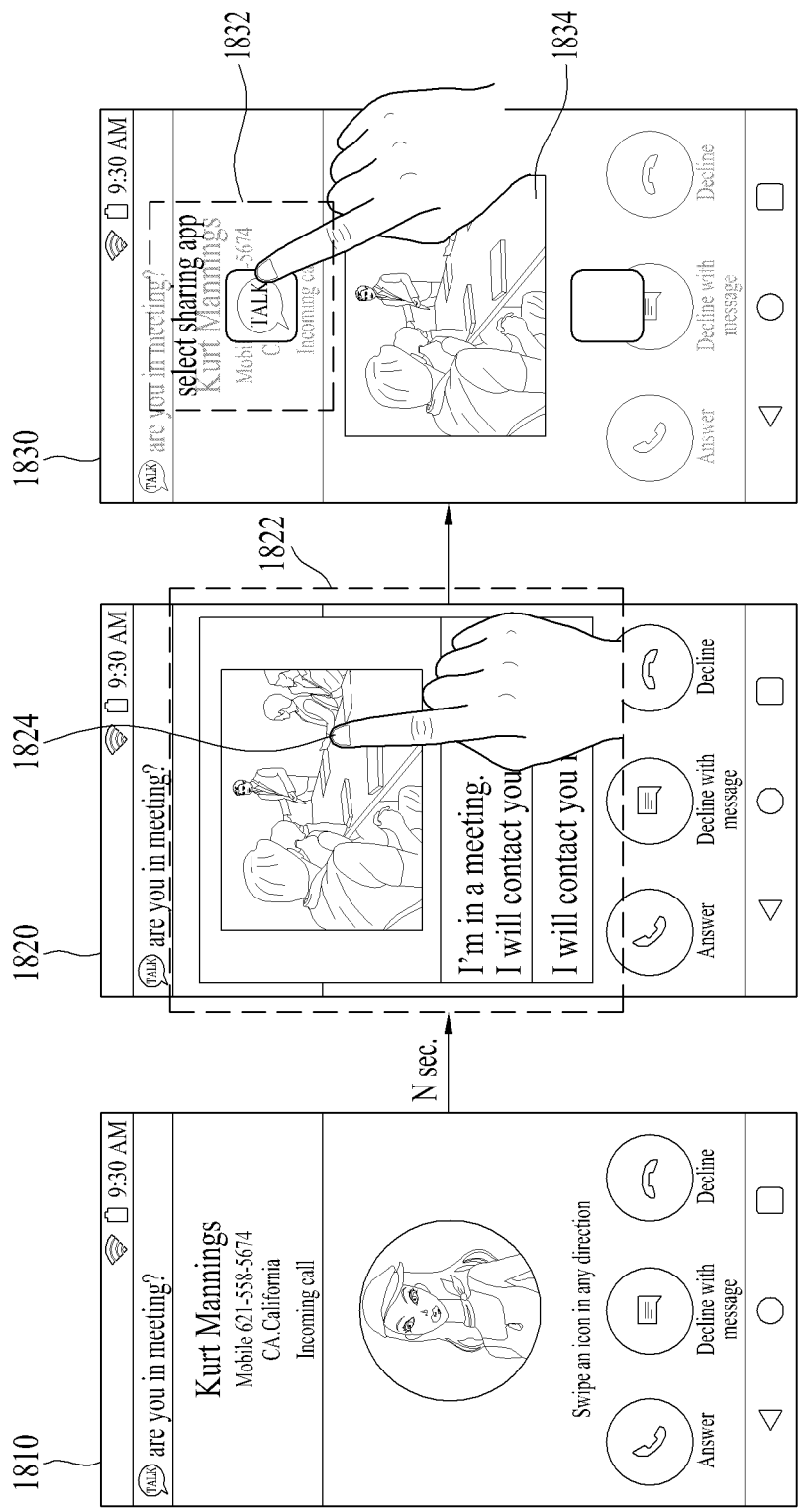
FIG. 18 is a diagram illustrating a method of displaying a camera preview on a screen if a user does not answer the phone for prescribed time and makes a mobile device stand and a method of capturing a front of a camera if a touch input is received from the user according to one embodiment of the present invention.

Next, FIG. 18 is a diagram illustrating a method of displaying a camera preview on a screen if a user does not answer the phone for prescribed time and makes a mobile device stand and a method of capturing a front of a camera if a touch input is received from the user according to one embodiment of the present invention.

If a call signal is received from an external device for more than prescribed time and an angle formed by a straight line passing through a top and a bottom of a camera of a mobile device and a horizontal surface is less than a prescribed angle, the controller 180 displays a preview image on a screen. If a touch input for capturing a picture is received from a user, the controller 180 captures a front of the camera and transmits the captured front image to the external device. The preview image corresponds to an image input via the camera 121 before a picture is captured. A user can configure a capturing composition and a focus target while watching the preview image.

As shown in the display screen 1810, if a call signal is received from an external device for more than prescribe time such as 15 seconds and an angle formed by a straight line passing through a top and a bottom of a rear camera 121b of a mobile device and a horizontal surface is less than a prescribed angle such as an angle ranging from 80 degrees to 120 degrees, As shown in the display screen 1820, the controller 180 displays a preview image 1822 on a screen.

As shown in the embodiment 1820, if a touch input 1824 for capturing a picture is received from a user, the camera 121b captures a picture of a camera front. As shown in the display screen 1830, the controller 180 transmits the captured front image 1834 to an external device using a specific application 1832. The controller 180 stores the captured front image in the memory 170.

In this instance, the specific application may correspond to KakaoTalk, Line, Twitter or the like. According to an embodiment of the present invention, if a user does not answer a phone call for prescribed time, a declining message can be automatically displayed. If a user raises a mobile device, a preview image is displayed on a screen. If a touch input is received from a user, it can capture a picture of a camera front.

Hence, for example, in a situation that a user is unable to receive a phone call such as a class, a meeting, driving and the like, since the user can transmit a specific image capable of explaining the situation instead of a text message, a conversation partner of a phone call can immediately know the situation of the user, thereby increasing user convenience.

Figure 19:
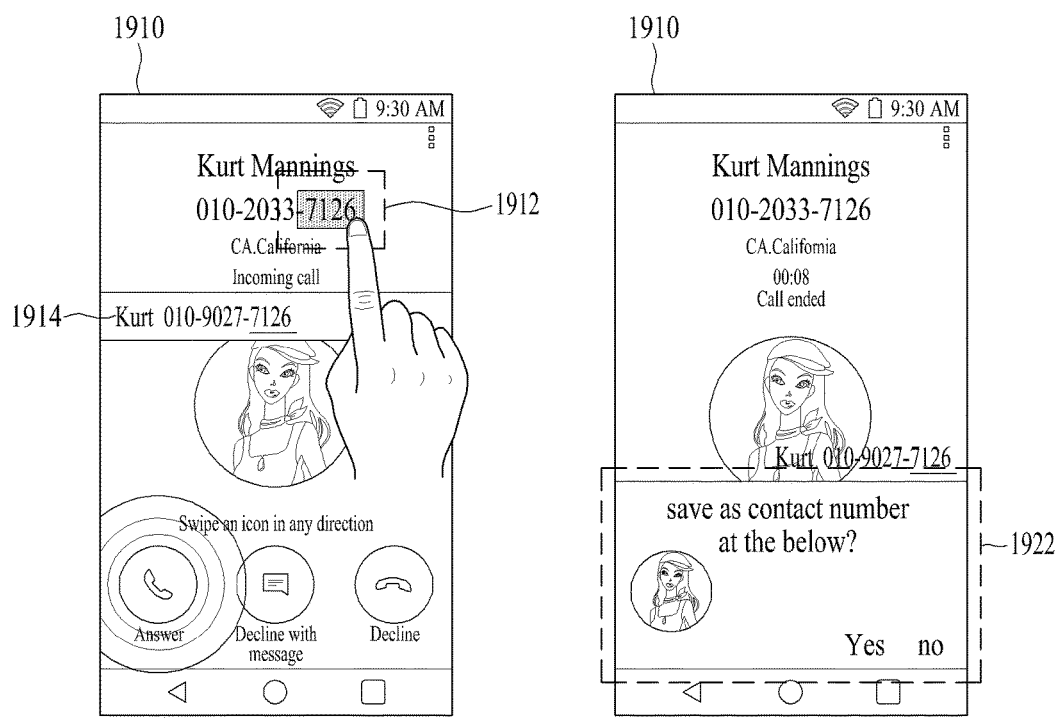
FIG. 19 is a diagram illustrating a method of executing a function capable of storing a telephone number similar to a specific telephone number if a touch input for pushing a specific telephone number area is received from a user after a telephone call with an external device of the specific telephone number is terminated according to one embodiment of the present invention.

FIG. 19 is a diagram illustrating a method of executing a function capable of storing a telephone number similar to a specific telephone number if a touch input for pushing a specific telephone number area is received from a user after a telephone call with an external device of the specific telephone number is terminated according to one embodiment of the present invention.

If a touch input on a specific area of a first screen is received from a user for more than prescribed time, the controller 180 displays a list related to the call signal on a screen. If communication time with the call signal is equal to or greater than prescribed time, the controller 180 can display a screen capable of storing a specific number related to the call signal.

As shown in the display screen 1910, if a touch input on a specific area 1912 of a first screen for more than prescribed time is received from a user, the controller 180 displays a list 1914 related to a call signal. In this instance, the prescribed time may correspond 3 seconds. As shown in the display screen 1920, if communication time with a call signal is equal to or greater than prescribed time, the controller 180 displays a screen 1922 capable of storing a specific telephone number 010-2033-7126 related to the call signal. In this instance, the prescribed time may correspond to 3 minutes.

According to an embodiment of the present invention, when a conversation partner changes a contact number but a user does not know the changed contact number, if a touch input for pushing a partial area of a specific telephone number is received from a user, a telephone number stored in the memory similar to the specific telephone number is searched and a result of the search is displayed on a screen. If a phone call with the conversation partner is ended and calling time with the conversation partner is equal to or greater than prescribed time, it is determined as the conversation partner has changed the contact number and the similar number is changed to the specific telephone number. By doing so, although the conversation partner changes the contact number, a user can conveniently change the contact number from a previous contact number to the changed telephone number, thereby increasing user convenience.

According to one embodiment of the present invention, when a phone call is received from a specific counterpart, it can enhance user convenience by displaying a screen including an execution screen of a specific application on the top of a reception screen and differently executing such a phone call reception mode as a normal phone call mode, a phone call declining mode, a speakerphone mode and the like according to a screen length.

According to another embodiment of the present invention, when a phone call is received from a specific counterpart, it can enhance user convenience by checking e-mail information received from the specific counterpart in real time by executing such a specific application as e-mail and making a call at the same time. According to another embodiment of the present invention, it can enhance user convenience by diversifying a phone call declining method by automatically sending a declining message if a user does not answer the phone call for prescribed time, displaying a preview image on a screen if the user raises the mobile device toward a specific direction, capturing a front direction of a camera and transmitting the captured front image to a counterpart if a touch input for capturing is received from the user.

According to the other embodiment of the present invention, when a phone call is received from a specific counterpart, it can enhance user convenience by checking reservation information received from the specific counterpart in real time by executing such a specific application as a calendar and making a call at the same time and automatically inputting the reservation information.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A mobile device, comprising:
a wireless communication processor configured to receive a call signal from an external device;
a display; and
a controller configured to:
display a first screen on the display including options for responding to the received call signal,
in response to a touch and drag input in a specific direction, display a second screen on the first screen,
respond to the received call signal in a hold mode when the second screen is touched and dragged in a first direction to a first distance,
respond to the received call signal in a normal mode when the second screen is touched and dragged in the first direction to a second distance greater than the first distance,
respond to the received call signal in a speakerphone mode when the second screen is touched and dragged in the first direction to a maximum extension of the second screen,
display at least one application icon in the second screen corresponding to a frequently used application while receiving call signals,
in response to a selection of the at least one application icon, display an execution screen of the frequently used application corresponding the selected at least one application icon in the second screen, and
in response to a touch input in the second screen displaying the execution screen of the frequently used application, display an execution screen of another frequently used application.

2. The mobile device of claim 1, wherein the controller is configured to decline the received call signal when the second screen is touched and dragged in the first direction to the first distance and then is dragged in a second direction opposite the first direction.

3. The mobile device of claim 1, wherein the controller is configured to display the second screen as increasing in length in response to the touching and dragging of the second screen or to display the second screen as maintaining a same length and moving along with the touching and dragging of the second screen.

4. The mobile device of claim 1, wherein the controller is configured to:
  display the second screen on the first screen in response to an incoming message being received from the external device,
  display specific message contents received from the external device when the second screen is touched and dragged to the second distance, and
  execute a messaging application for communicating with the external device when the second screen is touched and dragged to the maximum extension of the second screen.

5. The mobile device of claim 1, wherein the controller is configured to:
  receive a message from the external device before receiving the call signal,
  display contents of the received message in the second screen in response to receiving the call signal from the external device, and
  in response to a touch input on the second screen, display an additional message received from the external device on the second screen.

6. The mobile device of claim 1, wherein the controller is configured to:
  display a folder including at least one specific application corresponding to a frequently used application executed for the received call signal,
  execute the at least one specific application in response to a touch input for selecting the folder, and
  in response to the folder including first and second specific applications, execute the first and second specific applications in response to the touch input for selecting the folder.

7. The mobile device of claim 6, further comprising:
  an illumination sensor configured to detect an amount of brightness increase,
  wherein the controller is configured to automatically switch into a speaker mode when the amount of brightness increase detected by the illumination sensor within a prescribed time is equal to or greater than a reference value.

8. The mobile device of claim 6, wherein the controller is configured to display an execution screen of the second specific application different from a currently displayed execution screen of the first application in response to a touch input in a specific direction on the execution screen of the first specific application.

9. The mobile device of claim 1, wherein the controller is configured to:
  store a specific application of which the number of use is equal to or greater than a reference value when responding to the received call signal,
  execute the specific application in response to a touch input for executing the specific application, and
  display different amount of contents resulting from the executing specific application according to the distance the second screen is dragged.

10. The mobile device of claim 1, wherein the controller is configured to:
  execute a voice recognition application, and
  input text containing a specific word included in received voice to an input message box.

11. The mobile device of claim 1, wherein the controller is configured to:
  display a message box containing a specific message on the display in response to the call signal being received from the external device for more than prescribed time,
  receive an input for selecting the specific message, and
  transmit the specific message to the external device.

12. The mobile device of claim 11, wherein the controller is configured to transmit the specific message to the external device using a specific application in response to a dragging and dropping of the specific message on an execution screen of the specific application.

13. The mobile device of claim 11, wherein the controller is configured to:
  acquire information on a receiver containing a telephone number of the receiver from a memory,
  determine a priority based on the acquired information on the receiver,
  generate a second specific message based on the determined priority and a first specific message corresponding to the specific message, and
  transmit the generated second specific message to the external device.

14. The mobile device of claim 13, wherein the controller is configured to determine the priority based on text message content corresponding to the information on the receiver.

15. The mobile device of claim 1, wherein the controller is configured to:
  receive the call signal from the external device for more than a prescribed time,
  display a preview image in response to an angle formed by a straight line passing through a top and a bottom of a camera of the mobile device and a horizontal surface being less than a prescribed angle,
  capture a picture of a front of the camera in response to a touch input for capturing the picture, and
  transmit the captured front image to the external device.

16. The mobile device of claim 1, wherein the controller is configured to:
  display a list related to the call signal on the display in response to a touch input on a specific area of the first screen for more than a prescribed time, and
  display a screen for storing a specific telephone number related to the call signal when a communication time with the call signal being equal to or greater than the prescribed time.

17. A method of controlling a mobile device, the method comprising:
  receiving, via a wireless communication processor, a call signal from the external device;
  displaying a first screen on a display including options for responding to the received call signal;
  in response to a touch and drag input in a specific direction, displaying a second screen on the first screen;
  responding, via a controller, to the received call signal in a hold mode when the second screen is touched and dragged in a first direction to a first distance;
  responding, via the controller, to the received call signal in a normal mode when the second screen is touched and dragged in the first direction to a second distance greater than the first distance;
  responding, via the controller, to the received call signal in a speakerphone mode when the second screen is touched and dragged in the first direction to a maximum extension of the second screen;
  displaying at least one application icon in the second screen corresponding to a frequently used application while receiving call signals;

in response to a selection of the at least one application icon, displaying an execution screen of the frequently used application corresponding the selected at least one application icon in the second screen; and in response to a touch input in the second screen displaying the execution screen of the frequently used application, displaying an execution screen of another frequently used application.

18. The method of claim 17, further comprising:

declining, via the controller, the received call signal when the second screen is touched and dragged in the first direction to the first distance and then is dragged in a second direction opposite the first direction.

* * * * *